US006483932B1

(12) United States Patent
Martinez et al.

(10) Patent No.: US 6,483,932 B1
(45) Date of Patent: Nov. 19, 2002

(54) METHOD AND APPARATUS FOR ROLLED FINGERPRINT CAPTURE

(75) Inventors: Chris J. Martinez, Lake Worth, FL (US); Walter Guy Scott, North Palm Beach, FL (US)

(73) Assignee: Cross Match Technologies, Inc., Palm Beach Gardens, FL (US)

(*) Notice: Subject to any disclaimer, the term of this patent is extended or adjusted under 35 U.S.C. 154(b) by 0 days.

(21) Appl. No.: 09/377,597

(22) Filed: Aug. 19, 1999

(51) Int. Cl.$^7$ .................................................. G06K 9/00
(52) U.S. Cl. ........................ 382/124; 340/5.83; 283/68
(58) Field of Search ................................ 382/115, 124, 382/125, 127; 235/380, 492; 902/3, 4, 25; 340/5.82, 5.83; 283/68; 356/71; 705/1, 26, 42

(56) References Cited

U.S. PATENT DOCUMENTS 3,699,519 A    10/1972  Campbell ............ 340/146.3 E (List continued on next page.)

FOREIGN PATENT DOCUMENTS

| EP | 0 623 890 A2 | 11/1994 | |
|----|----|----|----|
| EP | 0 889 432 A2 | 1/1999 | |
| EP | 0 924 656 A2 | 6/1999 | |
| GB | 2 313 441 | 11/1997 | |
| WO | WO 97/41528 | 11/1997 | |
| WO | WO 98/09246 | 3/1998 | ............ G06K/9/00 |
| WO | WO 99/26187 | 5/1999 | ............ G06K/9/00 |

OTHER PUBLICATIONS

"Command Structure for a Low–Cost (Primitive) Film Scanner," *IBM Technical Disclosure Bulletin*, IBM Corp., vol. 35, No. 7, Dec. 1992, pp. 113–121.
*Fingerprint Scan API Toolkit Version 1.x Feature List* (Apr. 26, 2000) <http://www.mentalix.com/api/archive_fapiv-l.htm>, 3 pages.
"Image Acquisition System," *IBM Technical Disclosure Bulletin*, IBM Corp., vol. 29, No. 5, Oct. 1986, pp. 1928–1931.
Kunzman, Adam J. and Wetzel, Alan T., "1394 High Performance Serial Bus: The Digtial Interface for ATV," *IEEE Transaction on Computer Electronics*, IEEE, vol. 41, No. 3, Aug. 1995, pp. 893–900.
*Mentalix Provides The First IAFIS–Certified Latent Print Scanning Solution For Windows* (Jul. 23, 1999) <http://www.mentalix.com/pressreleases/fprintlook3_prel-.htm>, 2 pages.

(List continued on next page.)

*Primary Examiner*—Samir Ahmed
(74) *Attorney, Agent, or Firm*—Sterne, Kessler, Goldstein & Fox, P.L.L.C.

(57) ABSTRACT

A method and apparatus for rolled fingerprint capture is described. The start of a fingerprint roll is detected. A plurality of fingerprint image frames are captured. A centroid window corresponding to each of the plurality of captured fingerprint image frames is determined. Pixels of each determined centroid window are knitted into a composite fingerprint image. The end of the fingerprint roll is detected.

25 Claims, 17 Drawing Sheets

U.S. PATENT DOCUMENTS

| | | | |
|---|---|---|---|
| 4,032,975 A | 6/1977 | Malueg et al. | 358/213 |
| 4,601,195 A | 7/1986 | Garritano | 73/60 |
| 4,783,823 A | 11/1988 | Tasaki et al. | 382/4 |
| 4,784,484 A | 11/1988 | Jensen | 356/71 |
| 5,412,463 A | 5/1995 | Sibbald et al. | 356/71 |
| 5,469,506 A | 11/1995 | Berson et al. | 380/23 |
| 5,509,083 A | 4/1996 | Abtahi et al. | 382/124 |
| 5,598,474 A | 1/1997 | Johnson | 380/23 |
| 5,649,128 A | 7/1997 | Hartley | 395/309 |
| 5,745,684 A | 4/1998 | Oskouy et al. | 395/200.8 |
| 5,793,218 A | 8/1998 | Oster et al. | 324/754 |
| 5,805,777 A | 9/1998 | Kuchta | 395/112 |
| 5,815,252 A | 9/1998 | Price-Francis | 356/71 |
| 5,818,956 A | 10/1998 | Tuli | 382/3 |
| 5,825,005 A | 10/1998 | Behnke | 235/380 |
| 5,828,773 A | 10/1998 | Setlak et al. | 382/126 |
| 5,832,244 A | 11/1998 | Jolley et al. | 395/309 |
| 5,862,247 A | 1/1999 | Fisun et al. | 382/116 |
| 5,869,822 A | 2/1999 | Meadows, II et al. | 235/380 |
| 5,920,640 A | 7/1999 | Salatino et al. | 382/124 |
| 5,928,347 A | 7/1999 | Jones | 710/114 |
| 5,960,100 A | 9/1999 | Hargrove | 382/124 |
| 5,973,731 A | 10/1999 | Schwab | 348/161 |
| 5,987,155 A | 11/1999 | Dunn et al. | 382/116 |
| 5,995,014 A | 11/1999 | DiMaria | 340/825.31 |
| 6,018,739 A | 1/2000 | McCoy et al. | 707/102 |
| 6,023,522 A | 2/2000 | Draganoff et al. | 382/124 |
| 6,041,372 A | 3/2000 | Hart et al. | 710/62 |
| 6,075,876 A | 6/2000 | Draganoff | 382/124 |
| 6,078,265 A | 6/2000 | Bonder et al. | 340/825.31 |
| 6,088,585 A | 7/2000 | Schmitt et al. | 455/411 |
| 6,104,809 A | 8/2000 | Berson et al. | 380/23 |

OTHER PUBLICATIONS

Sluijs, F. et al., "An On–chip USB–powered Three–Phase Up/down DC/DC Converter in a Standard 3.3V CMOS Process," *2000 IEEE International Solid–State Circuits Conference*, IEEE, Feb. 9, 2000, pp. 440–441.

Venot, A. et al., "Automated Comparison of Scintigraphic Images," *Journal of Nuclear Medicine*, vol. 27, No. 8, Aug. 1986, pp. 1337–1342.

EPO Patent Abstract for Japanese Patent Publication No. 59–103474, published Jun. 14, 1984, 1 page.

EPO Patent Abstract for Japanese Patent Publication No. 10–079017, published Mar. 24, 1998, 1 page.

EPO Patent Abstract for Japanese Patent Publication No. 10–262071, published Sep. 29, 1998, 1 page.

EPO Patent Abstract for Japanese Patent Publication No. 11–167630, published Jun. 22, 1999, 1 page.

EPO Patent Abstract for Japanese Patent Publication No. 11–252489, published Sep. 17, 1999, 1 page.

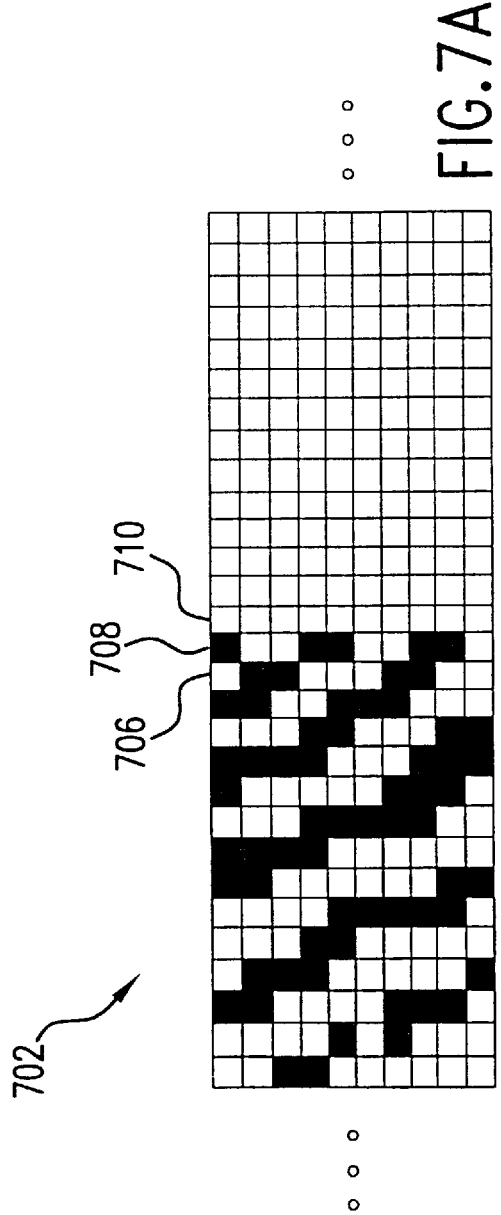
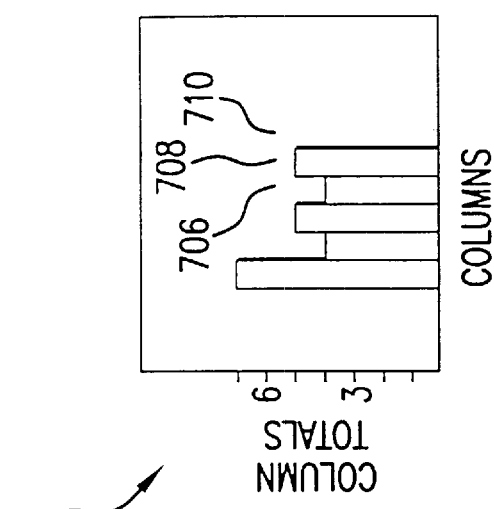
FIG.7A
FIG.7B

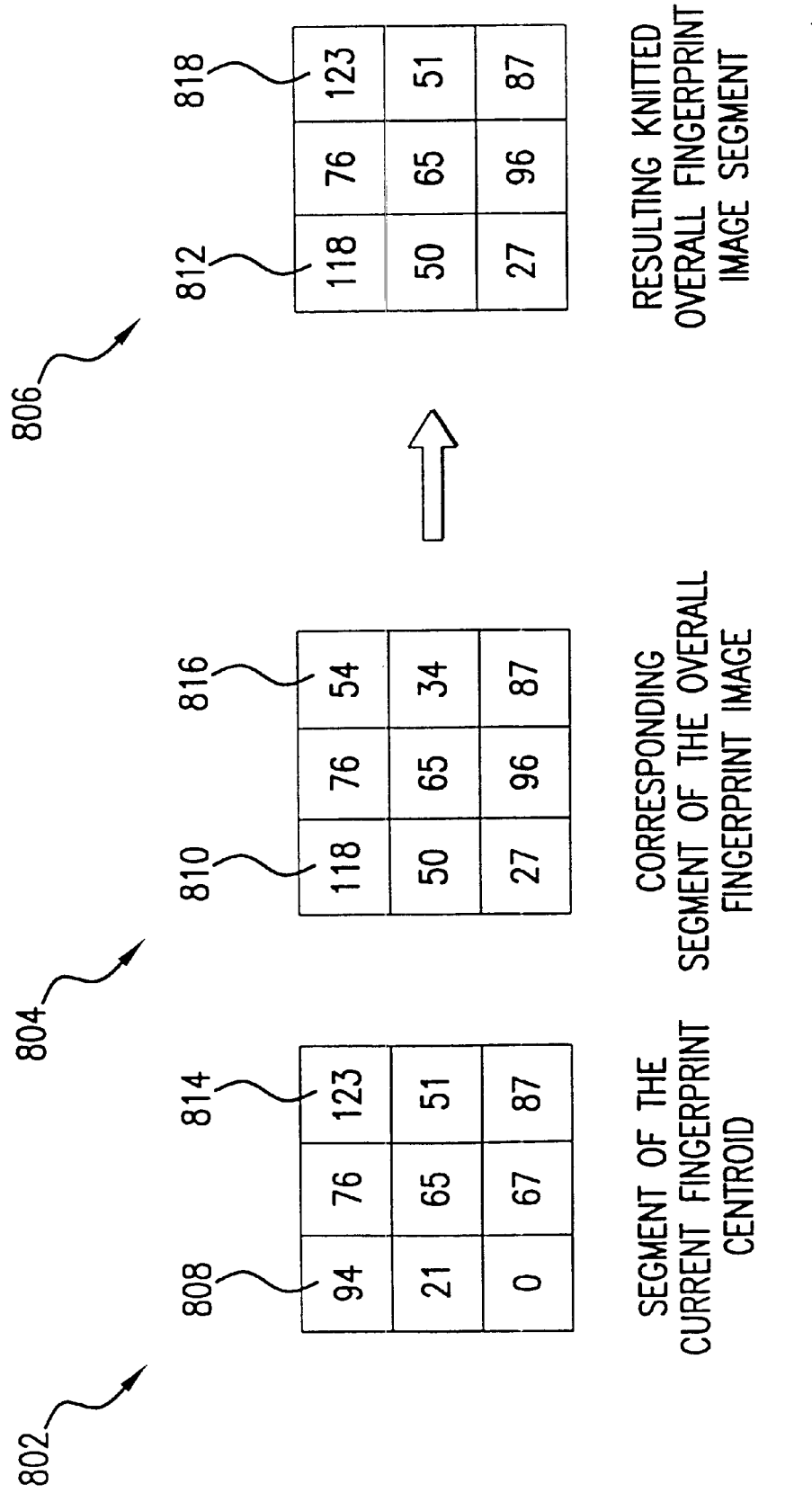

METHOD AND APPARATUS FOR ROLLED FINGERPRINT CAPTURE

BACKGROUND OF THE INVENTION

1. Field of the Invention

The present invention is directed to the field of rolled fingerprint capture, and more specifically, to capturing and combining multiple fingerprint images to generate an overall rolled fingerprint image.

2. Related Art

A rolled fingerprint scanner is a device used to capture rolled fingerprint images. The scanner captures the image of a user's fingerprint as the user rolls a finger across an image capturing surface. Multiple fingerprint images may be captured by the scanner as the finger is rolled. These images may be combined to form a composite rolled fingerprint image. A computer system may be used to create the composite rolled fingerprint image. Fingerprint images captured by a digital camera are generally comprised of pixels. Combining the pixels of fingerprint images into a composite fingerprint image is commonly referred to as pixel "knitting."

The captured composite rolled fingerprint image may be used to identify the user. Fingerprint biometrics are largely regarded as an accurate method of identification and verification. A biometric is a unique, measurable characteristic or trait of a human being for automatically recognizing or verifying identity. See, e.g., Roethenbaugh, G. Ed., *Biometrics Explained* (International Computer Security Association: Carlisle, Pa. 1998), pages 1–34, which is herein incorporated by reference in its entirety.

Capturing rolled fingerprints using a fingerprint scanner coupled to a computer may be accomplished in a number of ways. Many current technologies implement a guide to assist the user. These guides primarily come in two varieties. The first type includes a guide located on the fingerprint scanner itself. This type may include guides such as light emitting diodes (LEDs) that move across the top and/or bottom of the scanner. The user is instructed to roll the finger at the same speed as the LEDs moving across the scanner. In doing so, the user inevitably goes too fast or too slow, resulting in poor quality images. The second type includes a guide located on a computer screen. Again, the user must match the speed of the guide, with the accompanying disadvantages. What is needed is a method and apparatus for capturing rolled fingerprint images without the requirement of a guide.

Current devices exist for collecting rolled fingerprint images. For instance, U.S. Pat. No. 4,933,976 describes using the statistical variance between successive fingerprint image "slices" to knit together a composite fingerprint image. This patent also describes techniques for averaging successive slices into the composite image. These techniques have the disadvantage of less than desirable image contrast. What is needed is a method and apparatus for capturing rolled fingerprint images with improved contrast imaging.

SUMMARY OF THE INVENTION

The present invention is directed to a method and apparatus for rolled fingerprint capture. The invention detects the start of a fingerprint roll. A plurality of fingerprint image frames are captured. A centroid window corresponding to each of the plurality of captured fingerprint image frames is determined. Pixels of each determined centroid window are knitted into a composite fingerprint image. The end of the fingerprint roll is detected.

In an embodiment, a pixel intensity difference count percentage value between a current fingerprint image frame and a previous fingerprint image frame is generated. Whether the generated pixel intensity difference count percentage value is greater than a start roll sensitivity threshold percentage value is determined.

Furthermore, in embodiments, a pixel window in a captured fingerprint image frame is determined. A leading edge column and a trailing edge column of a fingerprint image in the corresponding generated pixel window are found. A centroid window in the captured fingerprint image frame bounded by the leading edge column found and the trailing edge column found is generated.

The present invention further provides a novel algorithm for knitting fingerprint images together. Instead of averaging successive pixels, the algorithm of the present invention compares an existing pixel value to a captured potential new pixel value. New pixel values are only knitted if they are darker than the existing pixel value. The resultant image of the present invention has a much higher contrast than images that have been averaged or smoothed by previous techniques. In an embodiment, the invention compares the intensity of each pixel of the determined centroid window to the intensity of a corresponding pixel of a composite fingerprint image. The pixel of the composite fingerprint image is replaced with the corresponding pixel of the determined centroid window if the pixel of the determined centroid window is darker than the corresponding pixel of the composite fingerprint image.

Furthermore, existing fingerprint capturing devices require actuating a foot pedal to begin the capture process. The present invention requires no such activation. The algorithm of the present invention can be instantiated through a variety of software/hardware means (e.g. mouse click, voice command, etc.).

According to a further feature, the present invention provides a rolled fingerprint capture algorithm that can operate in either of two modes: guided and unguided. The present invention may provide the guided feature in order to support legacy systems; however, the preferred mode of operation is the unguided mode. Capturing rolled fingerprints without a guide has advantages. These advantages include decreased fingerprint scanner device complexity (no guide components required), and no need to train users to follow the speed of the guide.

Further embodiments, features, and advantages of the present inventions, as well as the structure and operation of the various embodiments of the present invention, are described in detail below with reference to the accompanying drawings.

BRIEF DESCRIPTION OF THE FIGURES

The accompanying drawings, which are incorporated herein and form a part of the specification, illustrate the present invention and, together with the description, further serve to explain the principles of the invention and to enable a person skilled in the pertinent art to make and use the invention. In the drawings:

FIG. 7A shows a more detailed example pixel window.

FIG. 7B shows a histogram related to the example pixel window shown in FIG. 7A.

Figure 1:
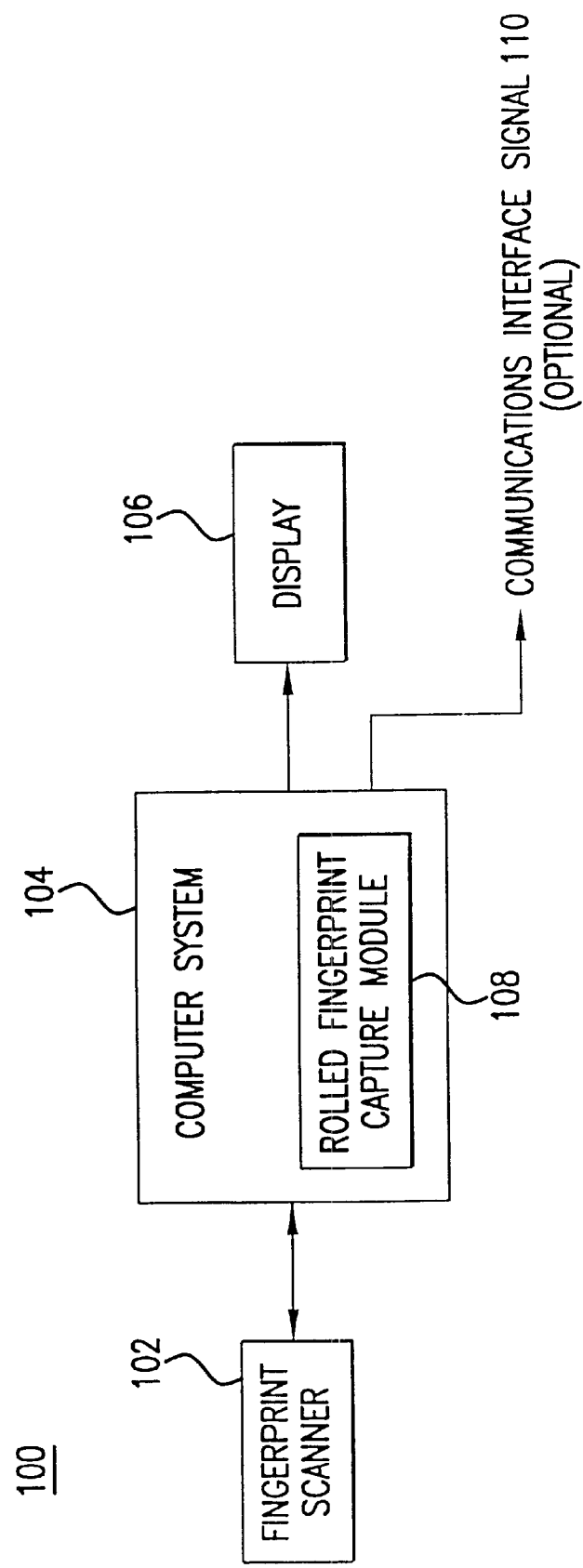
FIG. 1 illustrates an example high level block diagram of a preferred embodiment of the present invention.

The present invention will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE PREFERRED EMBODIMENTS

Overview and Terminology

The present invention is directed to a method and apparatus for rolled fingerprint capture. The invention detects the start and end of a fingerprint roll. One or more fingerprint image frames are captured. A centroid window corresponding to each of the captured fingerprint image frames is determined. Pixels of each determined centroid window are knitted into a composite fingerprint image. The composite fingerprint image represents an image of a complete fingerprint roll.

To more clearly delineate the present invention, an effort is made throughout the specification to adhere to the following term definitions as consistently as possible.

"USB" port means a universal serial bus port.

The term "fingerprint image frame" means the image data obtained in a single sample of a fingerprint image area of a fingerprint scanner, including fingerprint image data. A fingerprint image frame has a certain width and height in terms of image pixels, determined by the fingerprint scanner and the application.

The terms "centroid" or "fingerprint centroid" means the pixels of a fingerprint image frame that comprise a fingerprint.

The term "centroid window" means an area of pixels substantially surrounding and including a fingerprint centroid. This area of pixels can be any shape, including but not limited to rectangular, square, or other shape.

Example Rolled Fingerprint Capture Environment

Structural implementations for rolled fingerprint capture according to the present invention are described at a high-level and at a more detailed level. These structural implementations are described herein for illustrative purposes, and are not limiting. In particular, rolled fingerprint capture as described in this section can be achieved using any number of structural implementations, including hardware, firmware, software, or any combination thereof.

FIG. 1 illustrates an example high level block diagram of a preferred embodiment of the present invention. Rolled fingerprint capture apparatus 100 includes a fingerprint scanner 102, a computer system 104, and a display 106.

Fingerprint scanner 102 captures a user's fingerprint. Fingerprint scanner 102 may be any suitable type of fingerprint scanner, known to persons skilled in the relevant art(s). For example, fingerprint scanner 102 may be a Cross Match Technologies Verifier Model 290 Fingerprint Capture Device. Fingerprint scanner 102 includes a fingerprint image capturing area or surface, where a user may apply a finger, and roll the applied finger across the fingerprint capturing area or surface. Fingerprint scanner 102 periodically samples the fingerprint image capturing area, and outputs captured image data from the fingerprint image capturing area. Fingerprint scanner 102 is coupled to computer system 104.

Fingerprint scanner 102 may be coupled to computer system 104 in any number of ways. Some of the more common methods include coupling by a frame grabber, a USB port, and a parallel port. Other methods of coupling fingerprint scanner 102 to computer system 104 will be known by persons skilled in the relevant art(s), and are within the scope of the present invention.

Computer system 104 receives captured fingerprint image data from fingerprint scanner 102. Computer system 104 may provide a sampling signal to fingerprint scanner 102 that causes fingerprint scanner 102 to capture fingerprint image frames. Computer system 104 combines the captured fingerprint image data/frames into composite or overall fingerprint images. Further details of combining captured fingerprint image frames into composite or overall fingerprint images is provided below.

Computer system 104 may comprise a personal computer, a mainframe computer, one or more processors, specialized hardware, software, firmware, or any combination thereof, and/or any other device capable of processing the captured fingerprint image data as described herein. Computer system 104 may comprise a hard drive, a floppy drive, memory, a keyboard, a computer mouse, and any additional peripherals known to person(s) skilled in the relevant art(s), as necessary. Computer system 104 allows a user to initiate and terminate a rolled fingerprint capture session. Computer system 104 also allows a user to modify rolled fingerprint capture session options and parameters, as further described below.

Computer system 104 may be optionally coupled to a communications interface signal 110. Computer system 104 may output fingerprint image data, or any other related data, on optional communications interface signal 110. Optional communications interface signal 110 may interface the data with a network, the Internet, or any other data communication medium known to persons skilled in the relevant art(s). Through this communication medium, the data may be routed to any fingerprint image data receiving entity of interest, as would be known to persons skilled in the relevant art(s). For example, such entities may include the police and other law enforcement agencies. Computer system 104 may comprise a modem, or any other communications interface, as would be known to persons skilled in the relevant art(s), to transmit and receive data on optional communications interface signal 110.

Display 106 is coupled to computer system 104. Computer system 104 outputs fingerprint image data, including individual frames and composite rolled fingerprint images, to display 106. Any related rolled fingerprint capture session options, parameters, or outputs of interest, may be output to display 106. Display 106 displays the received fingerprint image data and related rolled fingerprint capture session options, parameters, and outputs. Display 106 may include a computer monitor, or any other applicable display known to persons skilled in the relevant art(s) from the teachings herein.

Embodiments for computer system 104 are further described below with respect to FIG. 10.

As shown in FIG. 1, computer system 104 comprises a rolled fingerprint capture module 108. Rolled fingerprint capture module 108 detects the start and stop of fingerprint rolls on fingerprint scanner 102. Furthermore, rolled fingerprint capture module 108 combines captured rolled fingerprint image frames into composite rolled fingerprint images. Further structural and operational detail of rolled fingerprint capture module 108 is provided below. Rolled fingerprint capture module 108 may be implemented in hardware, firmware, software, or a combination thereof. Other structural embodiments for rolled fingerprint capture module 108 will be apparent to persons skilled in the relevant art(s) based on the discussion contained herein.

The present invention is described in terms of the exemplary environment shown in FIG. 1. However, the present invention can be used in any rolled fingerprint capture environment where a fingerprint scanner that captures rolled fingerprint images is interfaced with a display that displays fingerprint images. For instance, in an embodiment, fingerprint scanner 102 and/or display 106 may comprise rolled fingerprint capture module 108. In such an embodiment, fingerprint scanner 102 may be coupled to display 106, and computer system 104 may not be necessary in part or in its entirety. Such embodiments are within the scope of the present invention.

Description in these terms is provided for convenience only. It is not intended that the invention be limited to application in this example environment. In fact, after reading the following description, it will become apparent to a person skilled in the relevant art how to implement the invention in alternative environments known now or developed in the future.

Rolled Fingerprint Capture Module Embodiments

Implementations for a rolled fingerprint capture module 108 are described at a high-level and at a more detailed level. These structural implementations are described herein for illustrative purposes, and are not limiting. In particular, the rolled fingerprint capture module 108 as described in this section can be achieved using any number of structural implementations, including hardware, firmware, software, or any combination thereof. The details of such structural implementations will be apparent to persons skilled in the relevant art(s) based on the teachings contained herein.

Figure 2A:
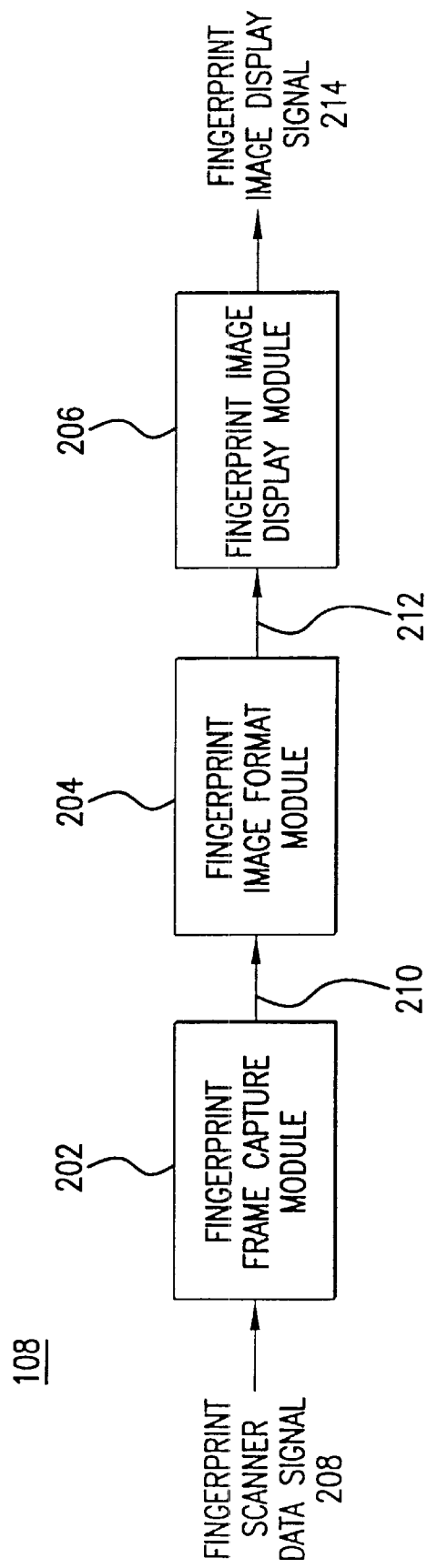
FIG. 2A illustrates a detailed block diagram of an embodiment of a rolled fingerprint capture module of the present invention.

FIG. 2A illustrates a more detailed block diagram of an embodiment of a rolled fingerprint capture module 108 of the present invention. Rolled fingerprint capture module 108 includes a fingerprint frame capture module 202, a fingerprint image format module 204, and a fingerprint image display module 206.

Fingerprint frame capture module 202 receives a fingerprint scanner data signal 208. Fingerprint scanner data signal 208 comprises fingerprint image frame data captured by fingerprint scanner 102. In an embodiment, fingerprint frame capture module 202 allocates memory to hold a fingerprint frame, initiates transfer of the frame from the fingerprint scanner 102, and arranges the pixels for subsequent analysis. Fingerprint frame capture module 202 outputs a captured fingerprint image frame data signal 210. Captured fingerprint image frame data signal 210 comprises fingerprint image frame data, preferably in the form of digitized image pixels. For instance, fingerprint image frame data signal 210 may comprise a series of slices of fingerprint image frame data, where each slice is a vertical line of image pixels.

Fingerprint image format module 204 receives captured fingerprint image frame data signal 210. Fingerprint image format module 204 detects the start and stop of fingerprint rolls using captured fingerprint image frame data signal 210. Furthermore, fingerprint image format module 204 combines captured rolled fingerprint image frames into composite rolled fingerprint images. Further structural and operational embodiments of rolled fingerprint capture module 108 are provided below. Fingerprint image format module 204 outputs a composite fingerprint image data signal 212. Composite fingerprint image data signal 212 comprises fingerprint image data, such as a single rolled fingerprint image frame, or any combination of one or more rolled fingerprint image frames, including a complete rolled fingerprint image.

Fingerprint image display module 206 receives composite fingerprint image data signal 212. Fingerprint image display module 206 provides any display formatting and any display drivers necessary for displaying fingerprint images on display 106. In a preferred embodiment, fingerprint image display module 206 formats the fingerprint image pixels into a Windows Device Independent Bitmap (DIB). This is a preferred image format used by the Microsoft Windows Graphical Device Interface (GDI) Engine. Fingerprint image display module 206 outputs a fingerprint image display signal 214, preferably in DIB format.

Figure 2B:
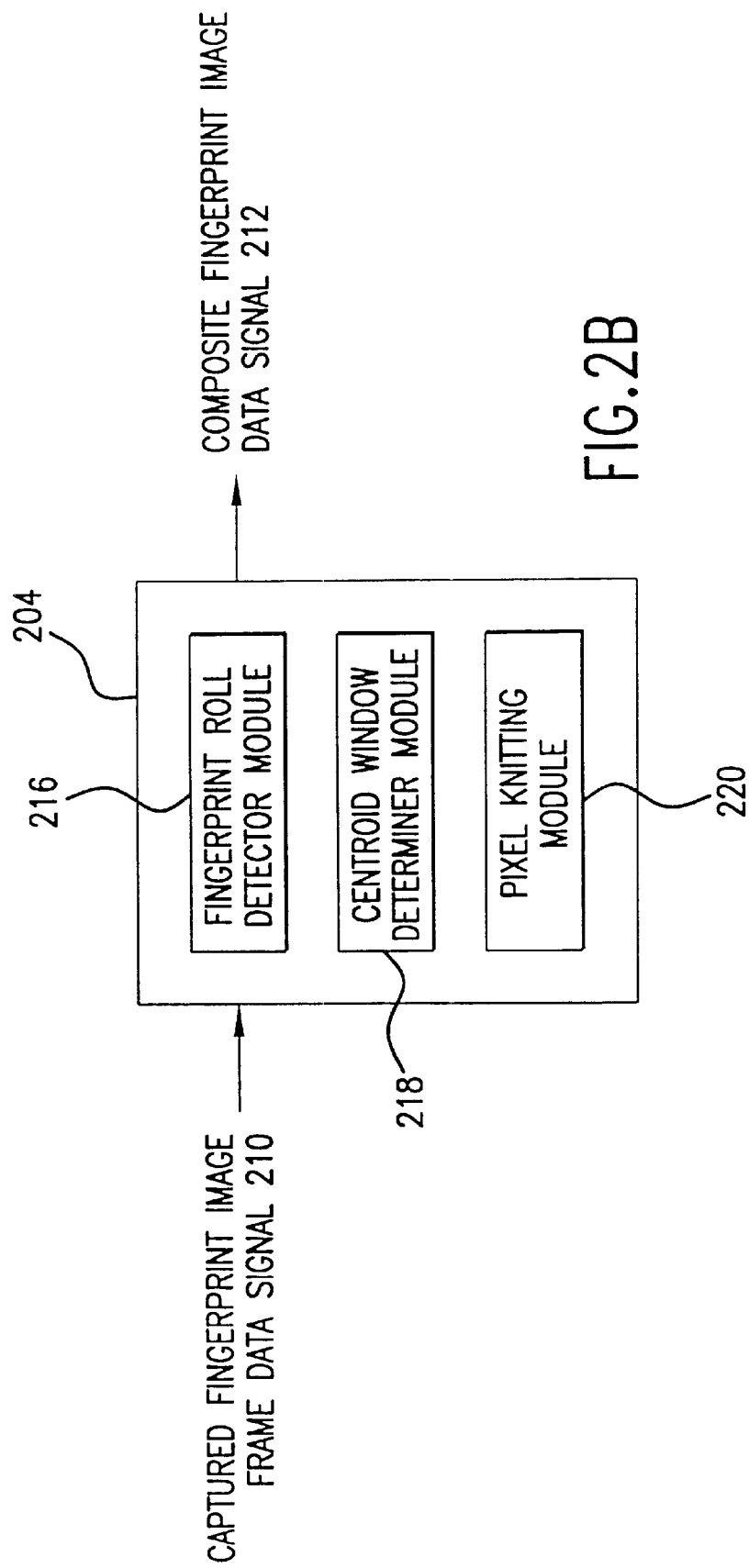
FIG. 2B illustrates a detailed block diagram of an embodiment of a fingerprint image format module.

FIG. 2B illustrates a more detailed block diagram of an embodiment of fingerprint image format module 204. Fingerprint image format module 204 includes fingerprint roll detector module 216, centroid window determiner module 218, and pixel knitting module 220.

Figure 2C:
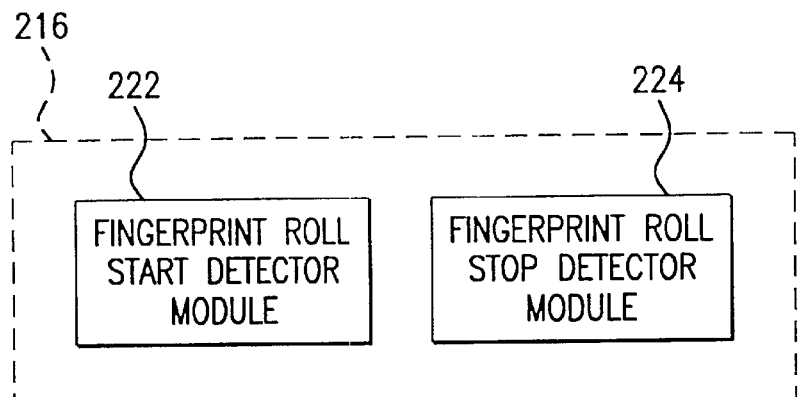
FIGS. 2C–2E illustrate example embodiments of a fingerprint roll detector module.
Figure 2D:
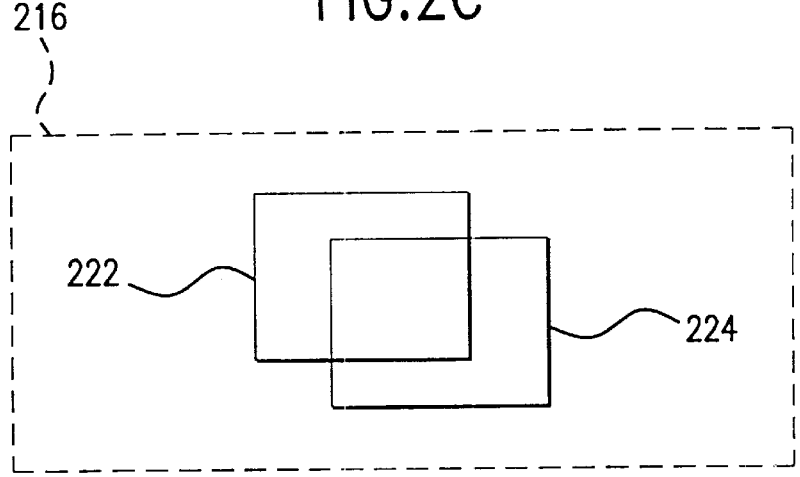
Figure 2E:
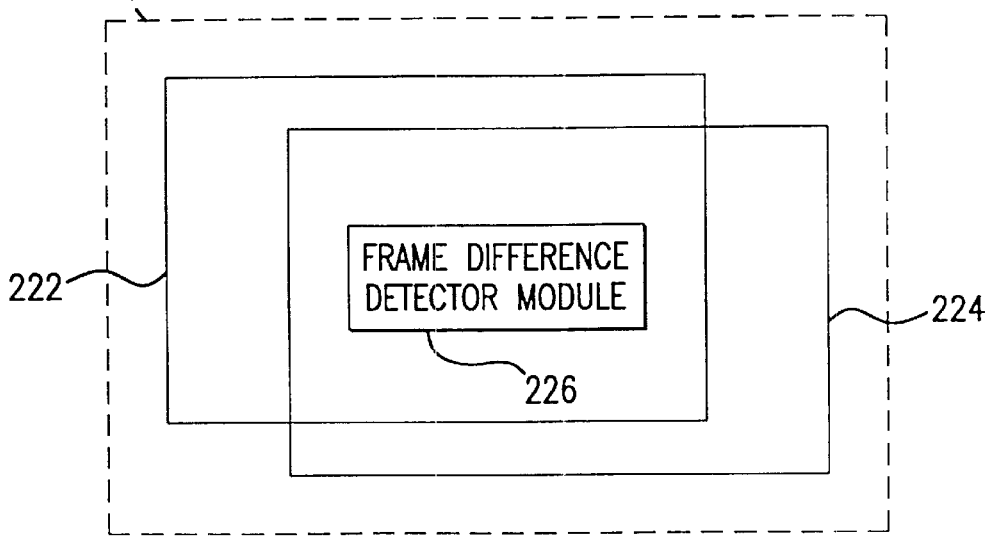

Fingerprint roll detector module 216 detects when a fingerprint roll has started, and detects when the fingerprint roll has stopped. FIG. 2C shows an example embodiment of fingerprint roll detector module 216. Fingerprint roll detector module 216 includes a fingerprint roll start detector module 222 and a fingerprint roll stop detector module 224. Fingerprint roll start detector module 222 detects the start of a fingerprint roll. Fingerprint roll stop detector module 224 detects the stop of a fingerprint roll. In the example embodiment of FIG. 2C, fingerprint roll start detector module 222 and fingerprint roll stop detector module 224 do not contain overlapping structure. In other embodiments, fingerprint roll start detector module 222 and fingerprint roll stop detector module 224 share structure. In an alternative embodiment shown in FIG. 2D, fingerprint roll start detector module 222 and fingerprint roll stop detector module 224 contain common structure. The common structure provides advantages, such as requiring a lesser amount of hardware, software, and/or firmware. In an example alternative embodiment shown in FIG. 2E, fingerprint roll start detector module 222 and fingerprint roll stop detector module 224 share a common frame difference detector module 226. Frame difference detector module 226 detects differences between consecutively captured fingerprint image frames. Embodiments of fingerprint roll start detector module 222, fingerprint roll stop detector module 224, and frame difference detector module 226 are described in greater detail below.

Referring back to FIG. 2B, centroid window determiner module 218 determines the portion of a captured fingerprint image frame where the finger currently is located. This portion of a fingerprint image frame is called a centroid window. Embodiments of this module are described in further detail below.

Pixel knitting module 220 knits together the relevant portions of centroid windows to create composite rolled fingerprint images. Embodiments of this module are described in further detail below.

The embodiments described above are provided for purposes of illustration. These embodiments are not intended to limit the invention. Alternate embodiments, differing slightly or substantially from those described herein, will be apparent to persons skilled in the relevant art(s) based on the teachings contained herein.

Operation

Exemplary operational and/or structural implementations related to the structure(s), and/or embodiments described above are presented in this section (and its subsections). These components and methods are presented herein for purposes of illustration, and not limitation. The invention is not limited to the particular examples of components and methods described herein. Alternatives (including equivalents, extensions, variations, deviations, etc., of those described herein) will be apparent to persons skilled in the relevant art(s) based on the teachings contained herein. Such alternatives fall within the scope and spirit of the present invention.

Figure 3A:
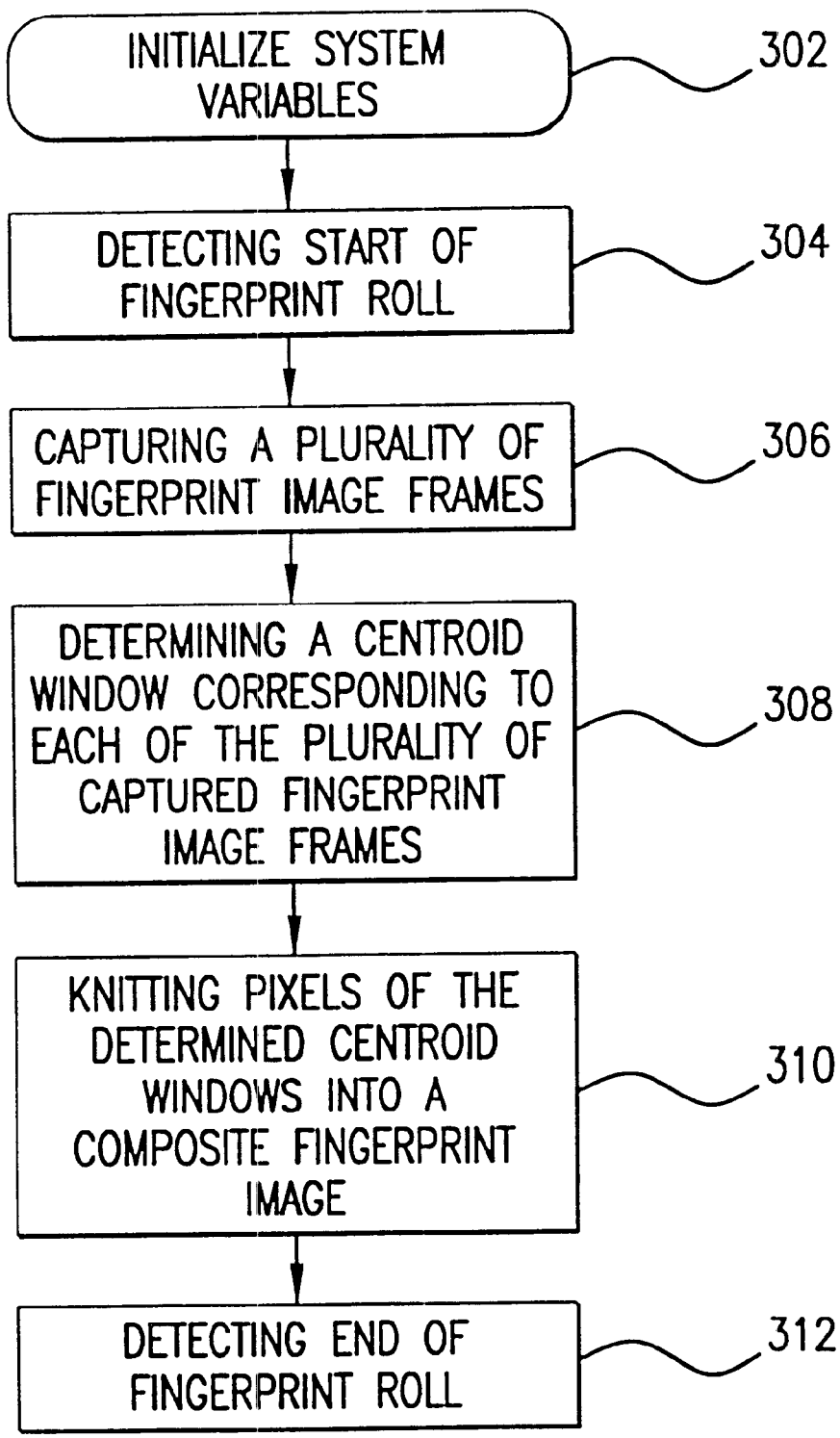
FIGS. 3A–3G show flowcharts providing detailed operational steps of an example embodiment of the present invention.

FIG. 3A shows a flowchart providing detailed operational steps of an example embodiment of the present invention. The steps of FIG. 3A may be implemented in hardware, firmware, software, or a combination thereof. For instance, the steps of FIG. 3A may be implemented by fingerprint image format module 204. Furthermore, the steps of FIG. 3A do not necessarily have to occur in the order shown, as will be apparent to persons skilled in the relevant art(s) based on the teachings herein. Other structural embodiments will be apparent to persons skilled in the relevant art(s) based on the discussion contained herein. These steps are described in detail below.

The process begins with step 302. In step 302, system variables are initialized. Control then passes to step 304.

In step 304, the start of a fingerprint roll is detected. Control then passes to step 306.

In step 306, a plurality of fingerprint image frames are captured. Control then passes to step 308.

In step 308, a centroid window corresponding to each of the plurality of captured fingerprint image frames is determined. Control then passes to step 310.

In step 310, pixels of the determined centroid windows are knitted into an overall fingerprint image. Control then passes to step 312.

In step 312, the end of a fingerprint roll is detected. The algorithm then ends.

More detailed structural and operational embodiments for implementing the steps of FIG. 3A are described below. These embodiments are provided for purposes of illustration, and are not intended to limit the invention. Alternate embodiments, differing slightly or substantially from those described herein, will be apparent to persons skilled in the relevant art(s) based on the teachings contained herein.

System Variable Initialization

In step 302, variables used by the routine steps must be initialized before the process proceeds. In a preferred embodiment, the initialization phase resets at least the variables shown in Table 1:

TABLE 1

System Variables

| Variable name | Variable type | Brief Description |
| --- | --- | --- |
| RollInitialized | boolean | indicates whether a fingerprint roll is initialized |
| RollDetected | boolean | indicates whether a fingerprint roll is detected |
| StartRollSensitivity | short integer | determines sensitivity for detecting a start of a fingerprint roll |
| StopRollSensitivity | short integer | determines sensitivity for detecting a stop of a fingerprint roll |
| CurrentBits | array of pixels | currently captured fingerprint frame |
| PreviousBits | array of pixels | previously captured fingerprint frame |
| ImageBits | array of pixels | composite fingerprint frame |

Both RollInitialized and RollDetected are initially set to FALSE. When a roll is initialized, RollInitialized is set to TRUE. When a roll is detected, RollDetected is set to TRUE. When a roll is complete, both variables are set to FALSE.

StartRollSensitivity and StopRollSensitivity may be fixed or adjustable values. In an embodiment, the StartRollSensitivity and StopRollSensitivity variables may be configured from a user interface to control the sensitivity of the rolling process. In an embodiment, these variables can take values between 0 and 100 representing low sensitivity to high sensitivity. Other value ranges may be used, as would be recognized by persons skilled in the relevant art(s).

CurrentBits, PreviousBits, and ImageBits are comprised of arrays of pixels, with each pixel having a corresponding intensity. In a preferred embodiment, all pixel intensity values in CurrentBits, PreviousBits, and ImageBits are set to 255 (base 10), which corresponds to white. Zero (0) corresponds to black. Pixel values in between 0 and 255 correspond to shades of gray, becoming lighter when approaching 255 from 0. This scheme may be chosen in keeping with the concept that a fingerprint image contains black ridges against a white background. Other pixel intensity value ranges may be used, as would be recognized by persons skilled in the relevant art(s). Furthermore, the invention is fully applicable to the use of a color fingerprint scanner, with colored pixel values, as would be recognized by persons skilled in the relevant art(s).

Detecting Start of Fingerprint Roll

In step 304, the start of a fingerprint roll is detected. Before a rolled fingerprint image can begin to be created, the system must detect that the user has placed a finger in or against the fingerprint image capturing area of fingerprint scanner 102 (shown in FIG. 1), and is beginning to roll the finger.

In a preferred embodiment, a method for detecting a finger on fingerprint scanner 102 is based on calculating a percentage intensity change from a previously captured fingerprint scanner image (PreviousBits) to a currently captured fingerprint scanner image (CurrentBits). Each pixel in CurrentBits may be compared to the corresponding, identically located pixel in PreviousBits. If the difference in the intensities of a compared pixel pair is greater than a predetermined threshold, that pixel pair is counted as being different. Once all pixels have been compared, the percentage of different pixels is calculated. In alternate embodiments, the number of different pixels may be calculated without determining a percentage. This calculated pixel difference percentage is used to determine when a roll has started and stopped. When the algorithm is initiated, this calculated percentage will be relatively low since virtually no pixels will be different.

Figure 4:
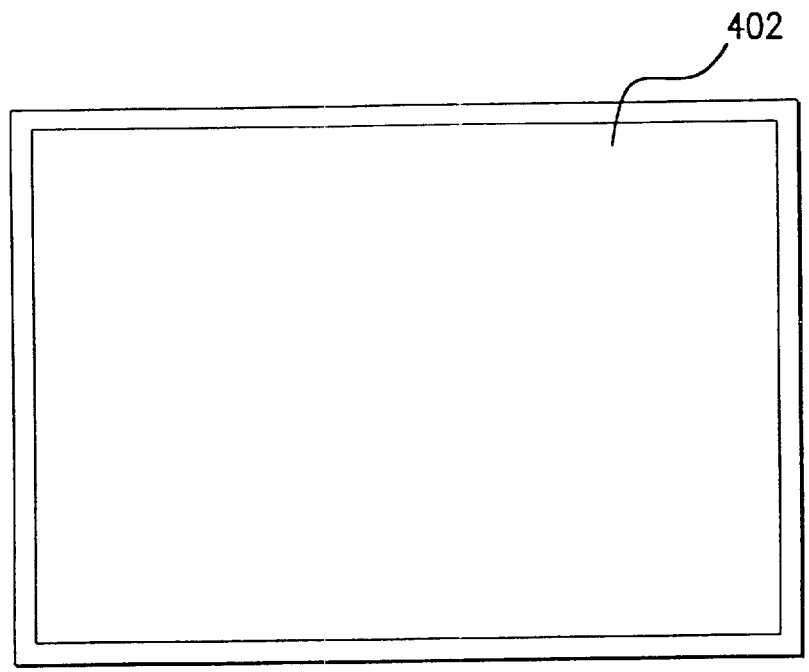
FIG. 4 shows an example captured image frame.

FIG. 4 shows an example captured image frame 402. Captured image frame 402 is substantially light or white, because no finger was present in the image capturing area of fingerprint scanner 102 when the frame was captured. Fingerprint image frames captured when no finger is present will have an overall lighter intensity value relative to when a finger is present.

Figure 5:
FIG. 5 shows an example captured fingerprint image frame with a fingerprint image present.

FIG. 5 shows an example captured fingerprint image frame 502 with a fingerprint image 504 present. Fingerprint image 504 represents the portion of a finger in contact with the fingerprint scanner image capturing area or surface. Because a fingerprint image 504 was captured, captured fingerprint image frame 502 will have an overall darker intensity value relative to captured image frame 402 (shown in FIG. 4). Hence, an increase in the calculated pixel difference percentage will occur after placing a finger in the image capturing area of a fingerprint scanner.

Once the calculated pixel difference percentage goes beyond a predetermined start roll sensitivity threshold value (StartRollSensitivity), the algorithm goes into rolling mode. As soon as the percentage goes below a predetermined stop roll sensitivity threshold value (StopRollSensitivity), the algorithm exits rolling mode (discussed in greater detail below). As discussed above, in alternate embodiments, the number of different pixels may be calculated, without determining a percentage, and this number may be compared to a predetermined stop roll sensitivity threshold value.

Figure 3B:
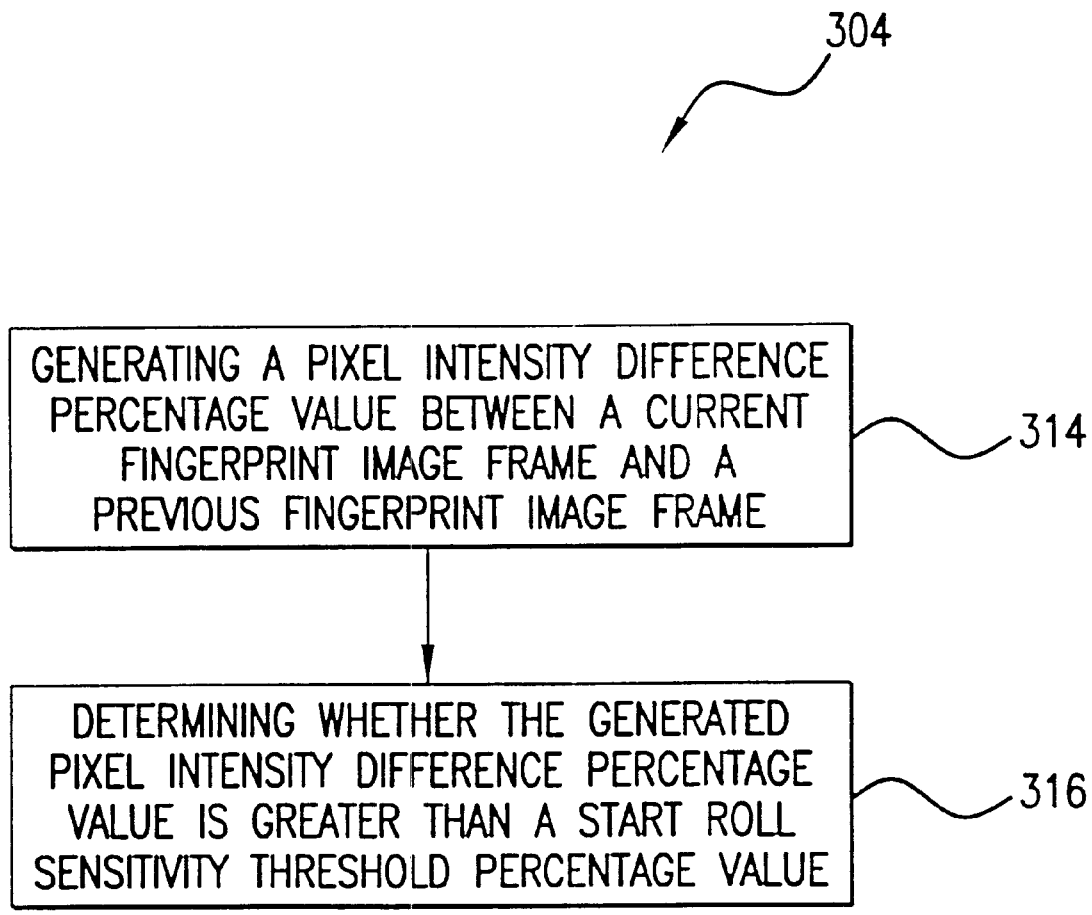

FIG. 3B provides a flowchart illustrating example steps for implementing step 304.

In step 314, a pixel intensity difference percentage value between a current fingerprint image frame and a previous fingerprint image frame is generated. In an alternate embodiment, a pixel intensity difference count value between a current fingerprint image frame and a previous fingerprint image frame may be generated. Control then proceeds to step 316.

In step 316, whether the generated pixel intensity difference percentage value is greater than a start roll sensitivity threshold percentage value is determined. In the alternate embodiment stated in step 314 above, whether a generated pixel difference count value is greater than a start roll sensitivity threshold value may be determined.

Figure 3C:
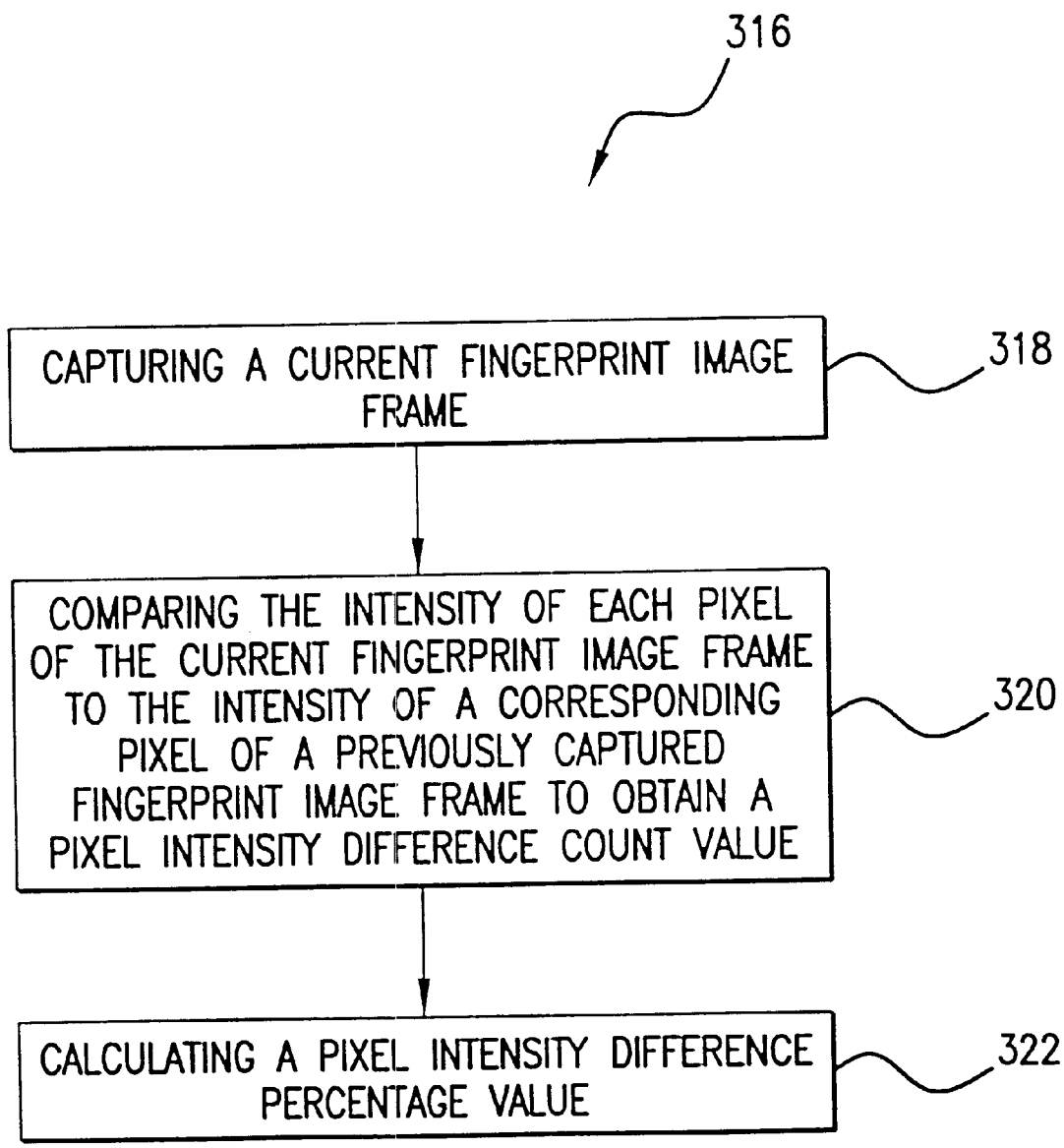

FIG. 3C provides a flowchart illustrating example steps for implementing an embodiment of step 316.

In step 318, a current fingerprint image frame is captured. Control then proceeds to step 320.

In step 320, the intensity of each pixel of the current fingerprint image frame is compared to the intensity of a corresponding pixel of a previously captured fingerprint image frame to obtain a pixel intensity difference count value. In embodiments, compared pixels are found different if their respective pixel intensity values are not the same. In alternative embodiments, compared pixels may be found different if their intensity values differ by greater than a pixel intensity difference threshold. The pixel intensity difference threshold may be established as a system variable, and may be set to a fixed value, or may be adjustable by a user. Control then proceeds to step 322.

In step 322, a pixel intensity difference percentage value is calculated. In an alternate embodiment, a pixel difference count value may be calculated.

In the following example of a preferred embodiment, a finger detected function (FingerDetected) is presented. This function may be called to detect whether a finger is present on a fingerprint scanner.

```
BOOL FingerDetected(void)
{
    double dDiff;
    double dDiffThreshold;
    short nPixelThreshold;
    dDiffThreshold=((100-m_nRollStartSensitivity)*0.08/
        100);
    nPixelThreshold=20;
    // calculate percentage change from previous DIB
    dDiff=FrameDifference((LPBITMAPINFO)&m_
        bmihPrevious, (LPBITMAPINFO)&m_bmih,
        nPixelThreshold);
    if (dDiff>dDiffThreshold)
    {
        return TRUE;
    }
    else
    {
        return FALSE;
    }
}
```

In this preferred embodiment, the finger detected function calls a frame difference function. The frame difference routine calculates the percentage difference between two frames. This difference is calculated down to the pixel level. Two pixels are considered to be different is their values are more than a certain value (nDiff) apart. In the following example of a preferred embodiment, a frame difference function (FrameDifference) is presented.

```
double FrameDifference(LPBITMAPINFO lpBMInfo1,
    LPBITMAPINFO lpBMInfo2, short nDiff)
{
    // this method compares two frames and returns the
        percentage of pixels
    // that are different. Two pixels are different if they differ
        by
    // more than nDiff
    LPBYTE lpBits1;
    LPBYTE lpBits2;
    double dPercentage;
    long lSize;
    long lCount;
    short nBytesPerPixel;
    // make sure that the bitmaps are the same size
    if    (lpBMInfo1->bmiHeader.biBitCount
        !=lpBMInfo2->bmiHeader.biBitCount ||
        lpBMInfo1->bmiHeader.biWidth
            !=lpBMInfo2->bmiHeader.biWidth ||
        lpBMInfo1->bmiHeader.biHeight
            !=lpBMInfo2->bmiHeader.biHeight)
    {
        // bitmaps are 100% different since they are not
        // the same size
        return 1.0;
    }
    lpBits1=(LPBYTE)lpBMInfo1+sizeof
        (BITMAPINFOHEADER)+(8==
        lpBMInfo1->bmiHeader.biBitCount?1024:0);
    lpBits2=(LPBYTE)lpBMInfo2+sizeof
        (BITMAPINFOHEADER)+(8==
        lpBMInfo2->bmiHeader.biBitCount?1024: 0);
    nBytesPerPixel=lpBMInfo1->bmiHeader.biBitCount/8;
    if (lpBMInfo1->bmiHeader.biBitCount % 8)
    {
        nBytesPerPixel++;
    }
```

```
lSize=lpBMInfo1->bmiHeader.biWidth*lpBMInfo1->
    bmiHeader.biHeight*nBytesPerPixel;
lCount=0;
for (long lIndex=0; lIndex<lSize; lIndex++)
{
    if (abs(lpBits1[lIndex]-lpBits2[lIndex])>nDiff)
    {
        lCount++;
    }
}
dpercentage=lCount/(double)lSize;
return dPercentage;
}
```

In embodiments, fingerprint roll detector module 216 of FIG. 2B may comprise one or both of the FingerDetected and FrameDifference functions or hardware equivalents. Fingerprint roll start detector module 222 of FIG. 2C may comprise one or both of the FingerDetected and FrameDifference functions or hardware equivalents. Furthermore, when present, frame difference detector module 226 of FIG. 2E may comprise one or both of the FingerDetected and FrameDifference functions or hardware equivalents.

Capturing Fingerprint Image Frames

Returning to FIG. 3A, in step 306, a plurality of fingerprint image frames are captured. Fingerprint image frames are captured from the fingerprint image area of fingerprint scanner 102. As discussed above, in an embodiment, a currently captured fingerprint image frame is stored in CurrentBits, and a previously captured fingerprint image frame is stored in PreviousBits. Portions of these arrays are combined in subsequent steps to form a composite fingerprint image. Portions of one or both of the fingerprint image frames that were used to detect the start of a fingerprint roll may also be used to form at least a portion of the composite fingerprint image.

Determining a Centroid Window

In step 308, a centroid window corresponding to each of the plurality of captured fingerprint image frames is determined. After the algorithm has detected that a fingerprint roll has started, the task of combining pixels from captured fingerprint image frames into a composite rolled fingerprint image begins. However, all of the pixels in a particular frame are not necessarily read. Only those pixels inside a particular window, the "centroid window," are read. A centroid window comprises captured fingerprint image pixels, substantially trimming off the non-relevant pixels of a captured fingerprint image frame. By focusing only on the relevant portion of the captured frame, the processing of the captured frame can proceed much faster.

Figure 6:
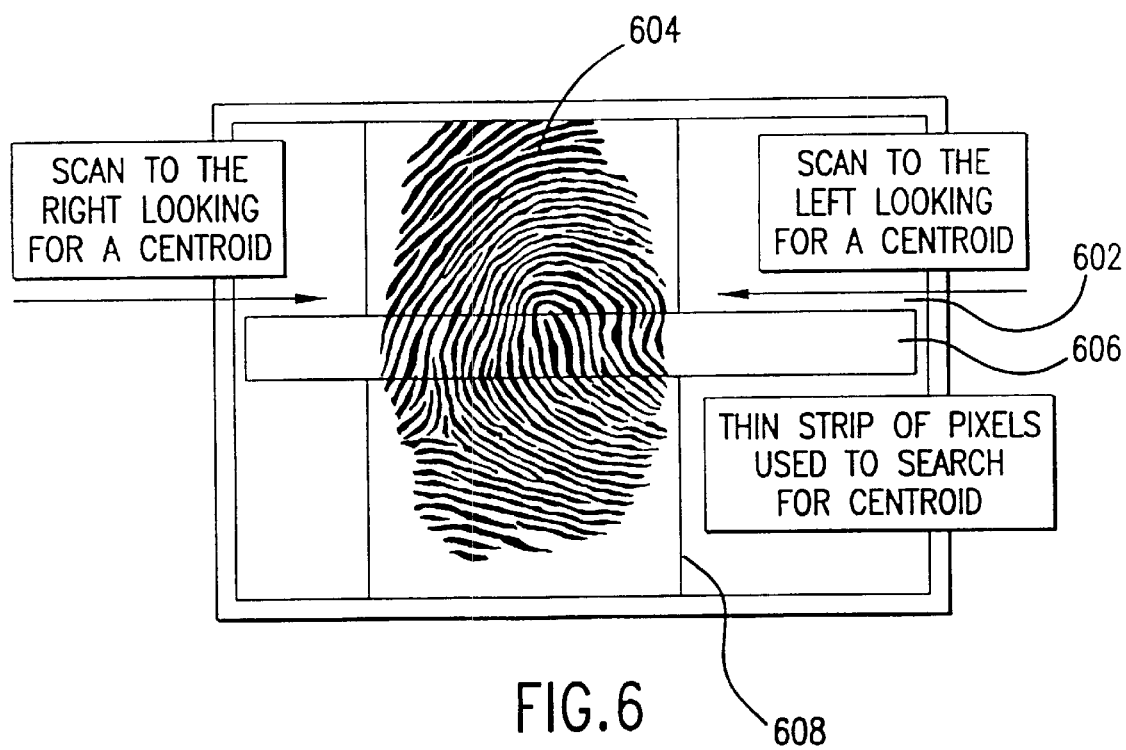
FIG. 6 shows an example captured fingerprint image frame with a fingerprint image and a pixel window present.

In an embodiment, to determine a centroid window, the leading and trailing edges of the fingerprint image in a captured fingerprint image frame are found. These edges are determined by sampling a thin strip of pixels in a pixel window across the center of a fingerprint frame. FIG. 6 shows an example captured fingerprint image frame 602 with a fingerprint image 604 and a pixel window 606 present. Pixel window 606 is shown across the center of captured fingerprint image frame 602. This generated pixel window is analyzed to determine the leading and trailing edges of fingerprint image 604. A centroid window is then generated within the leading and trailing edges in fingerprint image frame 602. An example centroid window 608 is shown in captured fingerprint image frame 602.

FIG. 7A shows a close-up view of an example pixel window 702. Pixel window 702 has a vertical pixel height of ten pixels. Pixels in pixel window 702 have two possible intensity values of 1 (light) or 0 (dark). These pixel height and intensity values for pixel window 702 are presented for illustrative purposes, and do not limit the invention. A wide range of these attributes for example pixel window 702 are possible, as would be known to persons skilled in the relevant art(s) from the teachings herein. For instance, in a fingerprint image frame where an average fingerprint ridge is five pixels high, a pixel window 702 of a height of twenty pixels be effectively used, fitting four fingerprint ridges within the window on average.

Furthermore, in alternative embodiments, more than one pixel window 702 may be generated to determine a centroid window. For example, three pixel windows may be generated within the fingerprint image frame, with pixel windows generated across the center, at or near the top, and at or near the bottom of the fingerprint image frame. Generating more than one pixel window may provide advantages in locating a fingerprint image within a fingerprint image frame, particularly if the fingerprint image is off-center.

A histogram is built from the generated pixel window. The histogram includes the total pixel intensity value for each column of pixels in pixel window 606. An example histogram 704 is shown graphically in FIG. 7B. Histogram 704 was built from pixel window 702 of FIG. 7A. Histogram 704 includes the total pixel intensity value for each column of pixels in example pixel window 702. For example, pixel column 706 of pixel window 702 has a total pixel intensity value of four, as indicated in histogram 704. Pixel columns 708 and 710 have respective total pixel intensity values of five and zero, as indicated in histogram 704.

To find the leading edge of a fingerprint image, the algorithm scans the histogram in the direction opposite of the direction of the fingerprint roll. The algorithm searches for a difference above a predetermined threshold between two adjacent columns. Where the total pixel intensity changes above the threshold value between columns, becoming darker, the leading edge is found. To find the trailing edge of the fingerprint, the algorithm scans the histogram in the direction of the fingerprint roll, in a similar fashion to finding the leading edge. The "x" coordinates of the leading and trailing edges of the histogram become the "x" coordinates of the leading and trailing edges of the centroid window.

In the example of FIGS. 7A and 7B, the leading edge of a fingerprint image may be found by scanning the histogram from right to left. When the predetermined threshold value is equal to four, for example, scanning the histogram will find a leading edge between pixel columns 708 and 710. In an embodiment, any column relative to a determined edge may be selected as a leading or trailing edge column. Additionally, for example, because column 708 is darker than column 710, column 708 may be chosen as the leading edge column.

Figure 3D:
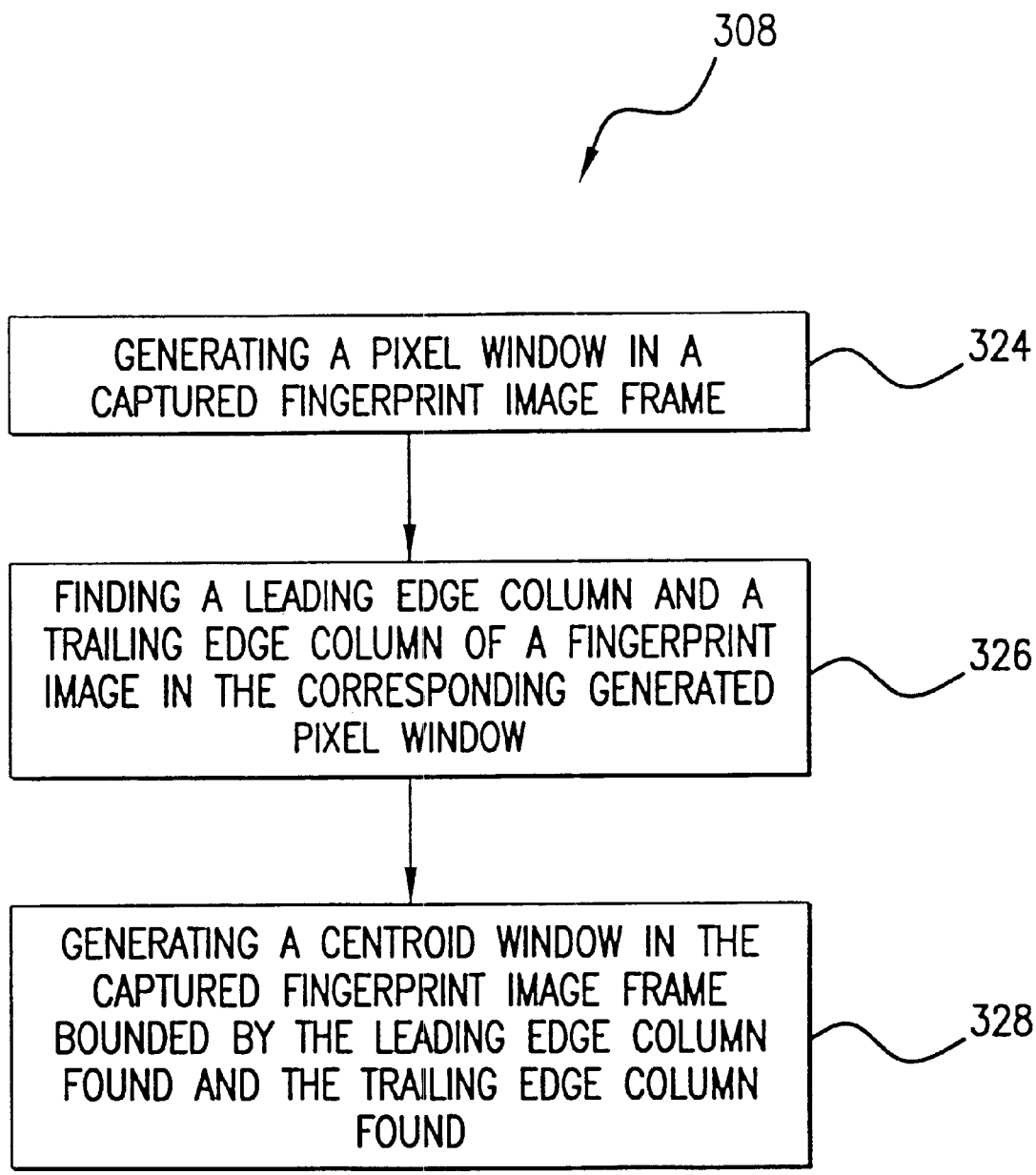

FIG. 3D provides a flowchart illustrating example steps for implementing step 308 of FIG. 3A.

In step 324, a pixel window in a captured fingerprint image frame is generated. Control then proceeds to step 326.

In step 326, a leading edge column and a trailing edge column of a fingerprint image are found in the corresponding generated pixel window. Control then proceeds to step 328.

In step 328, a centroid window in the captured fingerprint image frame bounded by the leading edge column found and the trailing edge column found is generated.

In a preferred embodiment, the window generated in step 328 is centered in an axis perpendicular to the direction that a finger is rolled. In such an embodiment, the generated window may include columns of a height of a predetermined number of pixels in the axis perpendicular to the direction that the finger is rolled. Furthermore, the generated window may have a length in an axis parallel to the direction that the finger is rolled equal to the number of pixels spanning the captured fingerprint image frame along that axis.

Figure 3E:
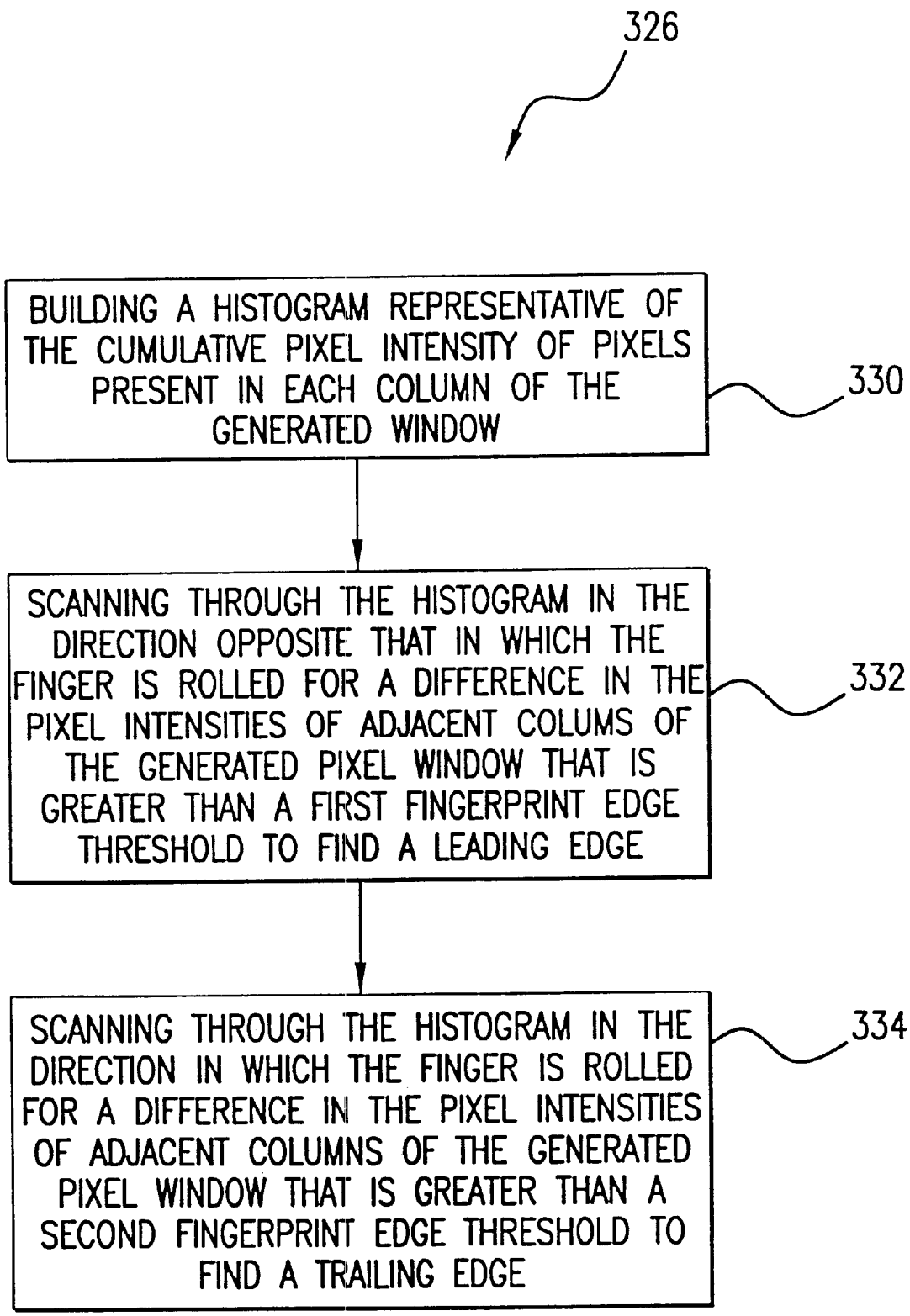

FIG. 3E provides a flowchart illustrating example steps for implementing step 326 of FIG. 3D.

In step 330, a histogram representative of the cumulative pixel intensity of pixels present in each column of the generated window is built. Control then proceeds to step 332.

In step 332, the histogram is scanned in the direction opposite of that in which the finger is rolled. The algorithm scans for a difference in the pixel intensities of adjacent columns of the generated window that is greater than a first fingerprint edge. In an embodiment, the darker column of the adjacent columns is designated the leading edge column. In alternative embodiments, other columns, such as the other adjacent column, may be designated as the leading edge column. Control then proceeds to step 334.

In step 334, the histogram is scanned in the direction in which the finger is rolled for a difference in the pixel intensities of two adjacent columns that is greater than a second fingerprint edge threshold. In an embodiment, the darker column of the adjacent columns is designated the trailing edge column. In alternative embodiments, other columns, such as the other adjacent column, may be designated as the trailing edge column.

In the following example of a preferred embodiment, a find centroid function (FindCentroid) is presented. The FindCentroid function may be called to determine a centroid window. The function builds a histogram from a generated pixel window in a captured fingerprint image frame, and searches from left to right and then right to left through the histogram, looking for the edges of a fingerprint.

```
BOOL FindCentroid(short*pnLeft, short*pnRight)
{
    LPBITMAPINFO lpBMInfo;
    LPBYTE lpCurrentBits;
    long* plhistogram;
    long lIndex;
    short nBytesPerPixel;
    const short cnEdgeThreshold=64;
    const short cnCushion=20;
    short nLeft;
    short nRight;
    short nTop;
    short nBottom;
    BOOL bFoundLeft=FALSE;
    BOOL bFoundRight=FALSE;
    lpBMInfo=(LPBITMAPINFO)&m__bmih;
    lpCurrentBits=(LPBYTE)lpBMInfo+sizeof
        (BITMAPINFOHEADER)+(8==
        lpBMInfo->bmiHeader.biBitCount ?1024:0);
    nBytesPerPixel=lpBMInfo->bmiHeader.biBitCount/8;
    if (lpBMInfo->bmiHeader.biBitCount % 8)
    {
        nBytesPerPixel++;
    }
    // bounds check on acquisition parameters
    nTop=lpBMInfo->bmiHeader.biHeight/2-10;
    nBottom=lpBMInfo->bmiHeader.biHeight/2+10;
    if (nTop<0)
    {
        nTop=0;
    if (nBottom>lpBMInfo->bmiHeader.biHeight)
    {
        nBottom=lpBMInfo->bmiHeader.biHeight;
    }
    nLeft=0;
    nRight=lpBMInfo->bmiHeader.biWidth;
    // build the histogram
    plHistogram=new long
        [lpBMInfo->bmiHeader.biWidth];
    memset(plHistogram, 0,
        lpBMInfo->bmiHeader.biWidth*sizeof(long));
    for (short nHeight=nTop; nHeight<nBottom; nHeight++)
    {
        for (short nWidth=nLeft; nWidth<nRight; nWidth++)
        {
            for (short nByte=0; nByte<nBytesPerPixel;
                nByte++)
            {
                lIndex=
                    nHeight*lpBMInfo->bmiHeader.biWidth*
                    nBytesPerPixel+nWidth*nBytesPerPixel+
                    nByte;
                plHistogram[nWidth]=plHistogram[nWidth]+
                    lpCurrentBits[lIndex];
            }
        }
    }
    // find the left edge
    for (short nWidth=nLeft+1; nWidth<nRight; nWidth++)
    {
        if (abs(plHistogram[nWidth]-plHistogram[nWidth-1])
            >cnEdgeThreshold)
        {
            *pnLeft=nwidth;
            bFoundLeft=TRUE;
            break;
        }
    }
    if (bFoundLeft)
    {
        // find the right edge
        for (short nwidth=nRight-1; nwidth>*pnLeft;
            nWidth--)
        {
            if (abs(plHistogram[nWidth]-plHistogram[nWidth-
                1])>cnEdgeThreshold)
            {
                *pnRight=nwidth;
                bFoundRight=TRUE;
                break;
            }
        }
    }
    // give the centroid some cushion
    *pnleft-=cnCushion;
    *pnRight+=cnCushion;
    if (*pnLeft<0)
    {
        *pnLeft=0;
    }
    if (*pnRight>lpBMInfo->bmiHeader.biWidth)
```

```
{
   *pnRight=lpBMInfo→bmiHeader.biWidth;
}
delete []plHistogram;
return bFoundLeft && bFoundRight;
}
```

In an embodiment, centroid window determiner module 218 of FIG. 2B may implement the FindCentroid function or hardware equivalent.

Knitting Pixels

Returning to FIG. 3A, in step 310, pixels of each determined centroid window are knitted into an overall fingerprint image. Only pixels within the determined centroid window are considered for knitting. This has the advantage of increasing the speed of the knitting process. The centroid window provides an indication of where the finger is currently located on the fingerprint scanner. Therefore, it is not necessary to copy or knit pixels that are outside of this window.

In a preferred embodiment, the copying of pixels for knitting is a conditional copy based on the intensity, or darkness, of the pixel. In other words, the algorithm for copying pixels from the centroid window is not a blind copy. The algorithm compares each pixel of the ImageBits array with the corresponding pixel of the CurrentBits array. A pixel will only be copied from CurrentBits if the pixel is darker than the corresponding pixel of ImageBits. This rule prevents the image from becoming too blurry during the capture process. This entire process is referred to herein as "knitting."

Figure 8:
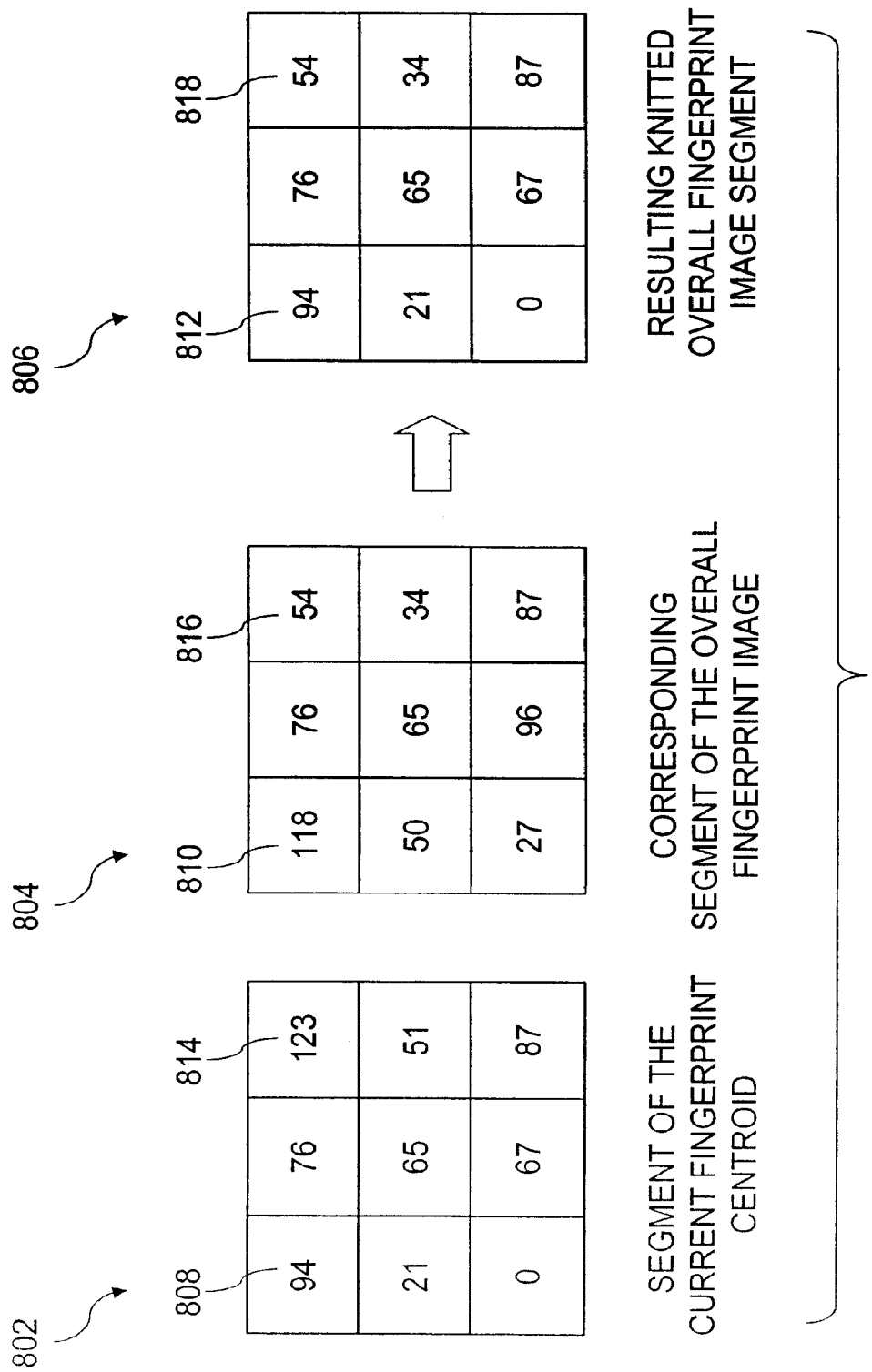
FIG. 8 shows an example of pixel knitting for an example segment of a composite fingerprint image.

FIG. 8 shows an example of pixel knitting for an example segment of a composite fingerprint image. Segment 802 is a three pixel by three pixel segment of a current fingerprint centroid (i.e., CurrentBits). Segment 804 is a three pixel by three pixel segment of a composite fingerprint image (i.e., ImageBits). Segments 802 and 804 each include nine pixels. The intensity values of these pixels are shown. Each pixel of segment 802 is compared to the corresponding pixel of segment 804. The pixel of segment 804 is replaced by the corresponding pixel of segment 802 if the pixel of segment 802 has a darker intensity value (e.g. a lower intensity value). A resulting knitted composite fingerprint image segment 806 is created.

For example, pixel 808 has an intensity value of 94. Pixel 808 is compared against pixel 810, which has an intensity value of 118. Because the intensity value of pixel 808 is darker than that of pixel 810 (i.e., 94 is a lower intensity value than 118), the intensity value of pixel 812 is set to the new pixel intensity value of pixel 808. Likewise, pixel 814 has an intensity value of 123. Pixel 814 is compared against pixel 816, which has an intensity value of 54. Because the intensity value of pixel 816 is darker than that of pixel 814 (i.e., 54 is a lower intensity value than 123), the intensity value of pixel 818 remains that of pixel 816.

Figure 3F:
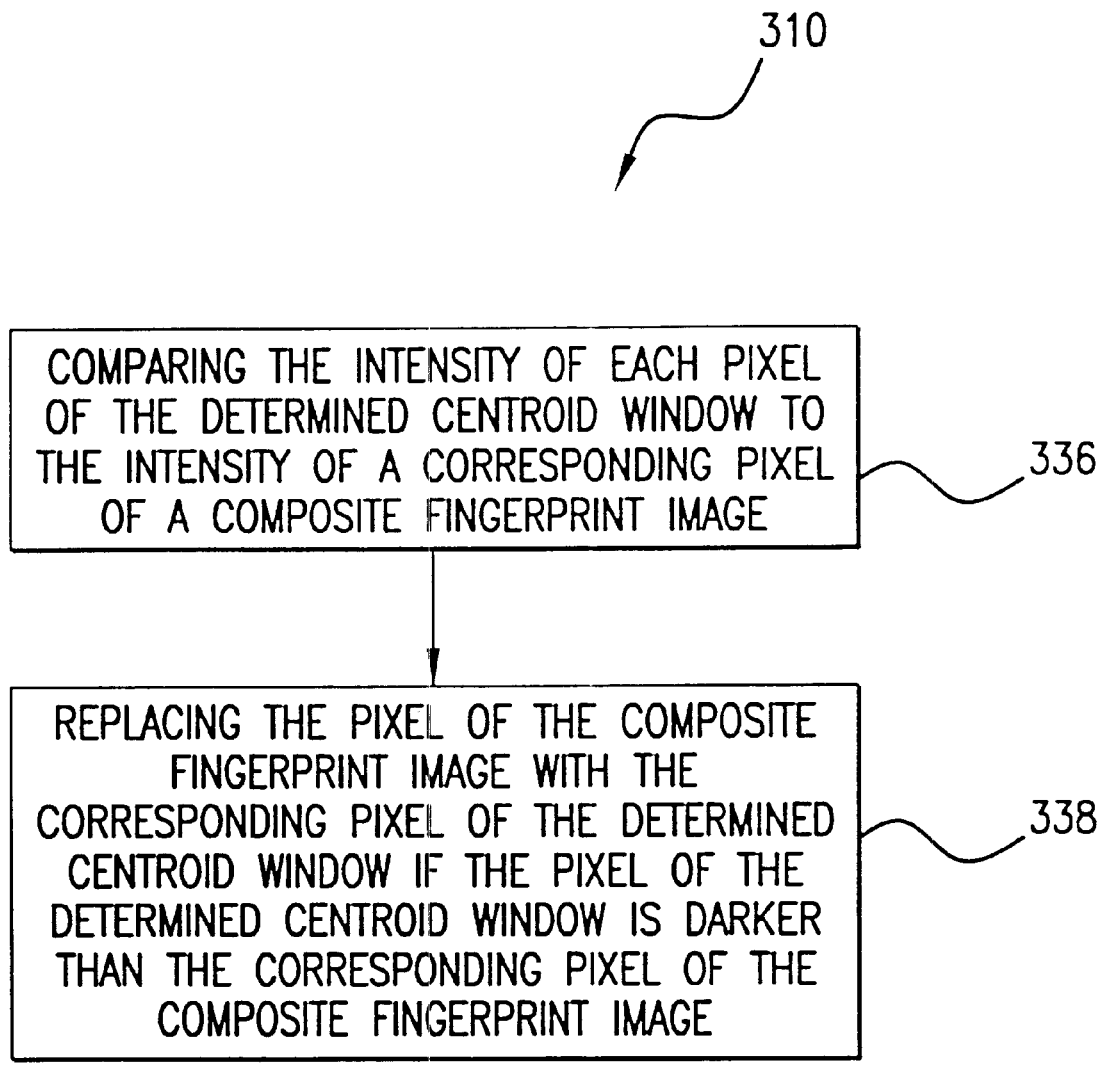

FIG. 3F provides a flowchart illustrating example steps for implementing step 310 of FIG. 3A.

In step 336, the intensity of each pixel of the determined centroid window is compared to the intensity of the corresponding pixel of an overall fingerprint image. Control then proceeds to step 338.

In step 338, the pixel of the composite fingerprint image is replaced with the corresponding pixel of the determined centroid window if the pixel of the determined centroid window is darker than the corresponding pixel of the composite fingerprint image.

In the following example of a preferred embodiment, a pixel knitting function (CopyConditionalBits) is presented.

The CopyConditionalBits function copies pixels from the determined centroid window (CurrentBits) into the overall image (ImageBits). The function does not blindly copy the pixels. Instead, the function will only copy a pixel if the new value is less than the previous value.

```
void ConditionalCopyBits(short nLeft, short nRight)
{
   LPBITMAPINFO lpBMInfo;
   LPBYTE lpCaptureBits;
   long lIndex;
   short nBytesPerPixel;
   lpBMInfo=(LPBITMAPINFO)&m_bmih;
   lpCaptureBits=(LPBYTE)lpBMInfo+sizeof
      (BITMAPINFOHEADER)+(8==
      lpBMInfo→bmiHeader.biBitCount
? 1024:0);
   nBytesPerPixel=lpBMInfo→bmiHeader.biBitCount/8;
   if (lpBMInfo→bmiHeader.biBitCount % 8)
   {
      nBytesPerPixel++;
   }
   // copy pixels from capture window only if less than
      previous
   for       (short        nHeight=0;
      nHeight<lpBMInfo→bmiHeader.biHeight;
      nHeight++)
   {
      for (short nWidth=nLeft; nWidth<nRight; nWidth++)
      {
         for (short nByte=0; nByte<nBytesPerPixel;
            nByte++)
         {
            lIndex=
               nHeight*lpBMInfo→bmiHeader.biWidth *
               nBytesPerPixel+nWidth*nBytesPerPixel+
               nbyte;
            // only copy if the new value is less than the
               previous
            if (m_lpRollBits[lIndex]>lpCaptureBits
               [lIndex])
            {
               m_lpRollBits[lIndex]=lpCaptureBits[lIndex];
            }
         }
      }
   }// end for
}
```

In an embodiment of the present invention, pixel knitting module 220 of FIG. 2B may implement the CopyConditionalBits function or hardware equivalent.

Detecting End of Fingerprint Roll

Figure 9:
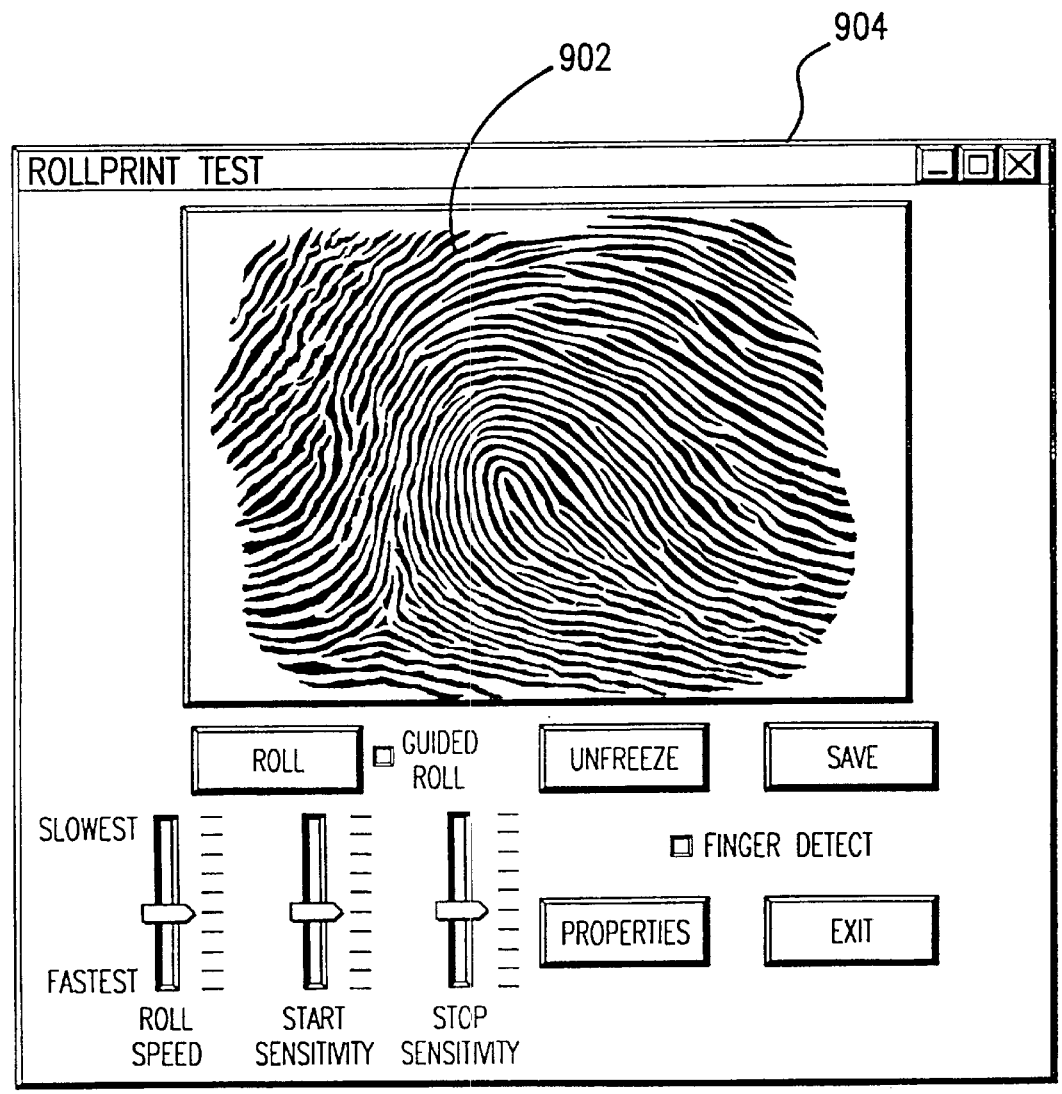
FIG. 9 shows an example of an overall rolled fingerprint image, displayed in a rolled fingerprint display panel.

Returning to FIG. 3A, in step 312, the end of a fingerprint roll is detected. After a fingerprint roll is complete, the user will remove their finger from the fingerprint scanner image capturing area. The system detects that the user has removed their finger, and ends the rolled fingerprint capturing algorithm. At this point, an overall rolled fingerprint image has been generated. FIG. 9 shows an example of an overall rolled fingerprint image 902, displayed in a rolled fingerprint display panel 904. Overall rolled fingerprint image 902 of FIG. 9 is a composite image, generated according to the present invention.

Returning to FIG. 3A, step 312 operates substantially similar to step 304, where the start of a fingerprint roll is detected. As discussed above, in a preferred embodiment, a method for detecting a finger on fingerprint scanner 102 is based on a percentage change from a previously captured fingerprint image (PreviousBits) to a currently captured fingerprint image (CurrentBits). Each pixel in CurrentBits is compared against the corresponding, identically located pixel in PreviousBits. If the difference in the intensities of a compared pixel pair is greater than a predetermined threshold, that pixel pair is counted as being different. Once all pixels have been compared, the percentage of different pixels is calculated. In alternate embodiments, the number of different pixels is calculated without determining a percentage.

As discussed above, this calculated pixel difference percentage is used to determine when a roll has started and stopped. When the rolled fingerprint capture algorithm is operating, and a fingerprint is being captured, this percentage will be relatively low because a relatively small number of pixels will be changing during the roll. However, when the user removes their finger from the scanner surface, the difference percentage will increase, as fingerprint image data is no longer being captured.

As discussed above, as soon as the percentage goes below a predetermined stop roll sensitivity threshold value (StopRollSensitivity), the algorithm exits rolled fingerprint capture mode.

Figure 3G:
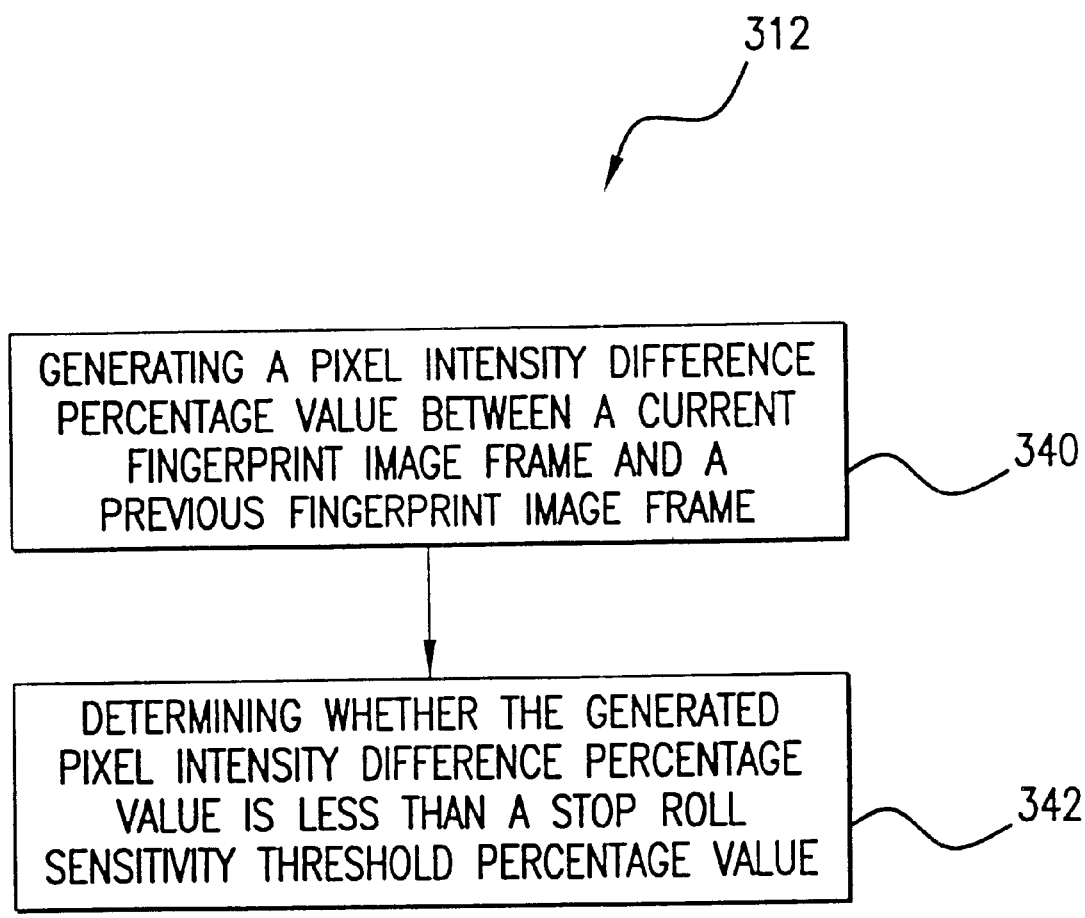

FIG. 3G provides a flowchart illustrating example steps for implementing step 312 of FIG. 3A.

In step 340, a pixel intensity difference percentage value between a current fingerprint image frame and a previous fingerprint image frame is generated. In an alternative embodiment, a pixel intensity difference count value between a current fingerprint image frame and a previous fingerprint image frame may be generated. Control then proceeds to step 342.

In step 342, whether the generated pixel intensity difference percentage value is less than a stop roll sensitivity threshold percentage value is determined. In the alternate embodiment mentioned in step 340, whether a generated pixel intensity difference count value is greater than a stop roll sensitivity threshold count value may be determined.

FIG. 3C provides a flowchart illustrating example steps for implementing an embodiment of step 340, and is described in more detail above in reference to step 304 of FIG. 3A.

A finger detected function (FingerDetected) is presented above in reference to step 304 of FIG. 3A. This function may be called to detect whether a finger is present on a fingerprint scanner. Refer to the section above for a more detailed description of this function. Furthermore, a frame difference function (FrameDifference) is also presented above in reference to step 304 of FIG. 3A. This function may be called to calculate the percentage difference between two frames. Refer to the section above for a more detailed description of this function.

In embodiments, fingerprint roll stop detector module 224 of FIG. 2C may comprise one or both of the FingerDetected and FrameDifference functions described above or hardware equivalents.

Rolled Fingerprint Display Panel

In an embodiment, rolled fingerprint display panel 904 of FIG. 9 is an example display panel that allows a user to input rolled fingerprint capture parameters, to begin a roll, and to view fingerprint images, among other functions. Some of these functions may include: indicating when a finger is present on the fingerprint scanner; permitting a user to select a roll speed for setting a fingerprint image capturing area sampling interval; permitting a user to select a start sensitivity threshold value for detecting a start of a fingerprint roll; permitting a user to select a stop sensitivity threshold value for detecting a stop of a fingerprint roll; permitting a user to select a guided roll mode; permitting a user to activate a roll mode; permitting a user to freeze/unfreeze a rolled fingerprint image; permitting a user to save an overall fingerprint image; permitting a user to alter the video properties of the fingerprint scanner; and permitting a user to exit the rolled fingerprint capture algorithm.

Example Computer System

Figure 10:
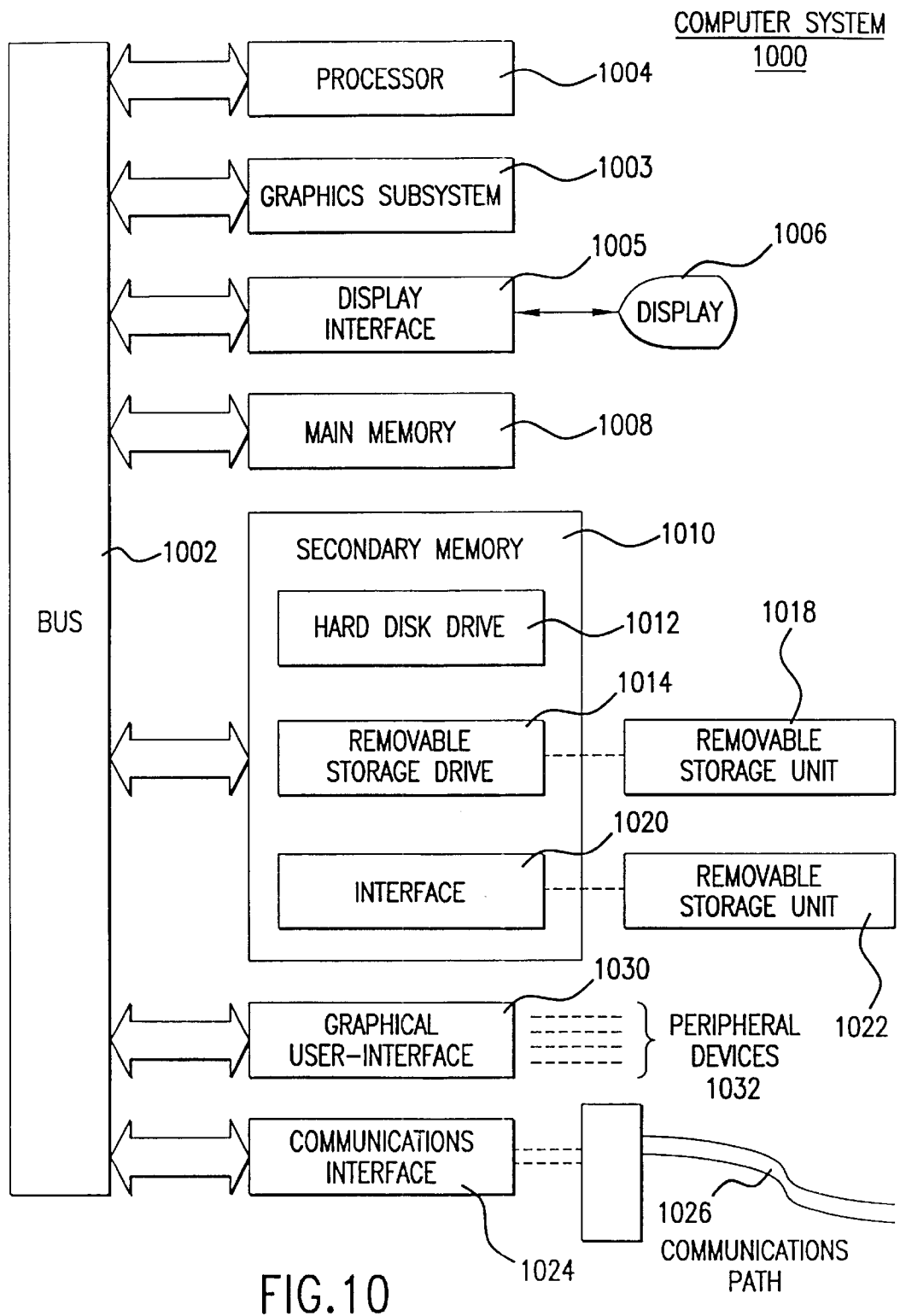
FIG. 10 shows an example computer system for implementing the present invention

An example of a computer system 104 is shown in FIG. 10. The computer system 104 represents any single or multi-processor computer. Single-threaded and multi-threaded computers can be used. Unified or distributed memory systems can be used.

The computer system 104 includes one or more processors, such as processor 1004. One or more processors 1004 can execute software implementing the routine shown in FIG. 3A as described above. Each processor 1004 is connected to a communication infrastructure 1002 (e.g., a communications bus, cross-bar, or network). Various software embodiments are described in terms of this exemplary computer system. After reading this description, it will become apparent to a person skilled in the relevant art how to implement the invention using other computer systems and/or computer architectures.

Computer system 104 may include a graphics subsystem 1003 (optional). Graphics subsystem 1003 can be any type of graphics system supporting computer graphics. Graphics subsystem 1003 can be implemented as one or more processor chips. The graphics subsystem 1003 can be included as a separate graphics engine or processor, or as part of processor 1004. Graphics data is output from the graphics subsystem 1003 to bus 1002. Display interface 1005 forwards graphics data from the bus 1002 for display on the display unit 106.

Computer system 104 also includes a main memory 1008, preferably random access memory (RAM), and can also include a secondary memory 1010. The secondary memory 1010 can include, for example, a hard disk drive 1012 and/or a removable storage drive 1014, representing a floppy disk drive, a magnetic tape drive, an optical disk drive, etc. The removable storage drive 1014 reads from and/or writes to a removable storage unit 1018 in a well known manner. Removable storage unit 1018 represents a floppy disk, magnetic tape, optical disk, etc., which is read by and written to by removable storage drive 1014. As will be appreciated, the removable storage unit 1018 includes a computer usable storage medium having stored therein computer software and/or data.

In alternative embodiments, secondary memory 1010 may include other similar means for allowing computer programs or other instructions to be loaded into computer system 104. Such means can include, for example, a removable storage unit 1022 and an interface 1020. Examples can include a program cartridge and cartridge interface (such as that found in video game devices), a removable memory chip (such as an EPROM, or PROM) and associated socket, and other removable storage units 1022 and interfaces 1020 which allow software and data to be transferred from the removable storage unit 1022 to computer system 104.

Computer system 104 can also include a communications interface 1024. Communications interface 1024 allows software and data to be transferred between computer system 104 and external devices via communications path 1026. Examples of communications interface 1024 can include a modem, a network interface (such as Ethernet card), a communications port, etc. Software and data transferred via communications interface 1024 are in the form of signals which can be electronic, electromagnetic, optical or other signals capable of being received by communications interface 1024, via communications path 1026. Note that communications interface 1024 provides a means by which computer system 104 can interface to a network such as the Internet.

Graphical user interface module 1030 transfers user inputs from peripheral devices 1032 to bus 1002. In an embodiment, one or more peripheral devices 1032 may be fingerprint scanner 102. These peripheral devices 1032 also can be a mouse, keyboard, touch screen, microphone, joystick, stylus, light pen, voice recognition unit, or any other type of peripheral unit.

The present invention can be implemented using software running (that is, executing) in an environment similar to that described above with respect to FIG. 10. In this document, the term "computer program product" is used to generally refer to removable storage unit 1018, a hard disk installed in hard disk drive 1012, or a carrier wave or other signal carrying software over a communication path 1026 (wireless link or cable) to communication interface 1024. A computer useable medium can include magnetic media, optical media, or other recordable media, or media that transmits a carrier wave. These computer program products are means for providing software to computer system 104.

Computer programs (also called computer control logic) are stored in main memory 1008 and/or secondary memory 1010. Computer programs can also be received via communications interface 1024. Such computer programs, when executed, enable the computer system 104 to perform the features of the present invention as discussed herein. In particular, the computer programs, when executed, enable the processor 1004 to perform the features of the present invention. Accordingly, such computer programs represent controllers of the computer system 104.

In an embodiment where the invention is implemented using software, the software may be stored in a computer program product and loaded into computer system 104 using removable storage drive 1014, hard drive 1012, or communications interface 1024. Alternatively, the computer program product may be downloaded to computer system 104 over communications path 1026. The control logic (software), when executed by the one or more processors 1004, causes the processor(s) 1004 to perform the functions of the invention as described herein.

In another embodiment, the invention is implemented primarily in firmware and/or hardware using, for example, hardware components such as application specific integrated circuits (ASICs). Implementation of a hardware state machine so as to perform the functions described herein will be apparent to persons skilled in the relevant art(s).

Conclusion

While various embodiments of the present invention have been described above, it should be understood that they have been presented by way of example only, and not limitation. It will be apparent to persons skilled in the relevant art that various changes in form and detail can be made herein without departing from the spirit and scope of the invention. Thus, the breadth and scope of the present invention should not be limited by any of the above-described exemplary embodiments, but should be defined only in accordance with the following claims and their equivalents.

What is claimed is:

1. A method for rolled fingerprint capture, comprising the steps of:

(1) detecting the start of a fingerprint roll, including the steps of:

(a) generating a pixel intensity difference count value between a current fingerprint image frame and a previous fingerprint image frame, including the steps of comparing the intensity of a plurality of pixels in the current fingerprint image frame to the intensity of a corresponding plurality of pixels in the previous fingerprint image frame, and summing pixels determined to have different intensities during said comparing step to generate the pixel intensity difference count value, and (b) determining whether the generated pixel intensity difference count value is greater than a start roll sensitivity threshold value;

(2) capturing a plurality of fingerprint image frames;

(3) determining a centroid window corresponding to each of the plurality of captured fingerprint image frames;

(4) knitting pixels of each determined centroid window into a composite fingerprint image; and (5) detecting the end of said fingerprint roll.

2. A method for rolled fingerprint capture, comprising the steps of (1) detecting the start of a fingerprint roll, including the steps of:

(a) generating a pixel intensity difference percentage value between a current fingerprint image frame and a previous fingerprint image frame, including the steps of comparing the intensity of a plurality of pixels in the current fingerprint image frame to the intensity of a corresponding plurality of pixels in the previous fingerprint image frame to obtain a pixel intensity difference count value, and calculating the pixel intensity difference percentage value to be a ratio of the pixel intensity difference count value to the number of the plurality of pixels present in a fingerprint image frame; and (b) determining whether the generated pixel intensity difference percentage value is greater than a start roll sensitivity threshold percentage value;

(2) capturing a plurality of fingerprint image frames;

(3) determining a centroid window corresponding to each of the plurality of captured fingerprint image frames;

(4) knitting pixels of each determined centroid window into a composite fingerprint image; and (5) detecting the end of said fingerprint roll.

3. The method of claim 2, wherein step (a) comprises the steps of:

(i) capturing a current fingerprint image frame; and (ii) comparing the intensity of each pixel of the current fingerprint image frame to the intensity of a corresponding pixel of a previously captured fingerprint image frame.

4. The method of claim 2, wherein step (a) further comprises the step of:

finding compared pixels to be different if their intensity values differ by greater than a pixel intensity difference threshold.

5. The method of claim 1, wherein step (iv) comprises the steps of:

(a) comparing the intensity of each pixel of the determined centroid window to the intensity of a corresponding pixel of a composite fingerprint image; and (b) replacing the pixel of the composite fingerprint image with the corresponding pixel of the determined centroid window if the pixel of the determined centroid window is darker than the corresponding pixel of the composite fingerprint image.

6. method for detecting the start of a fingerprint roll in a rolled fingerprint capture system comprising the steps of:
   (a) capturing a first fingerprint image frame;
   (b) capturing a second fingerprint image frame;
   (c) generating a pixel intensity difference count value between the second fingerprint image frame and the first fingerprint image frame, including the steps of
      (1) comparing the intensity of a plurality of pixels in the second fingerprint image frame to the intensity of a corresponding plurality of pixels in the first fingerprint image frame, and
      (2) summing pixels determined to have different intensities during step (1) to generate the pixel intensity difference count value; and
   (d) determining whether the generated pixel intensity difference count value is greater than a start roll sensitivity threshold value.

7. The method of claim 6, wherein step (1) comprises the step of:
   (i) comparing the intensity of each pixel of the second fingerprint image frame to the intensity of a corresponding pixel of the first fingerprint image frame.

8. The method of claim 6, wherein step (1) comprises the step of:
   finding compared pixels to be different if their intensity values differ by greater than a pixel intensity difference threshold.

9. A method for detecting the start of a fingerprint roll in a rolled fingerprint capture system, comprising the steps of:
   (a) capturing a first fingerprint image frame;
   (b) capturing a second fingerprint image frame;
   (c) generating a pixel intensity difference percentage value between the second fingerprint image frame and a first fingerprint image frame, including the steps of
      (1) comparing the intensity of a plurality of pixels in the second fingerprint image frame to the intensity of a corresponding plurality of pixels in the first fingerprint image frame to obtain a pixel intensity difference count value, and
      (2) calculating the pixel intensity difference percentage value to be a ratio of the pixel intensity difference count value to the number of the plurality of pixels; and
   (d) determining whether the generated pixel intensity difference percentage value is greater than a start roll sensitivity threshold percentage value.

10. The method of claim 9, wherein step (1) comprises the step of:
    (i) comparing the intensity of each pixel of the second fingerprint image frame to the intensity of a corresponding pixel of the first fingerprint image frame.

11. The method of claim 9, wherein step (1) comprises the step of:
    finding compared pixels to be different if their intensity values differ by greater than a pixel intensity difference threshold.

12. The method of claim 11, wherein step (1) further comprises the step of:
    counting the compared pixels found to be different to produce the pixel intensity difference count value.

13. A system for rolled fingerprint capture, comprising:
    a fingerprint roll start detector module that detects the start of a fingerprint roll in a fingerprint image capturing area, wherein the fingerprint roll start detector module generates a pixel intensity difference count value between a first fingerprint image frame and a second fingerprint image frame, wherein the fingerprint roll start detector module compares the intensity of a plurality of pixels in the second fingerprint image frame to the intensity of a corresponding plurality of pixels in the first fingerprint image frame and sums the pixels determined to have different intensities to generate the pixel intensity difference count value, and wherein the fingerprint roll start detector module determines whether the generated pixel intensity difference count value is greater than a start roll sensitivity threshold value.

14. The system of claim 13, wherein said fingerprint roll start detector module compares the intensity of each pixel of the second fingerprint image frame to the intensity of a corresponding pixel of the first fingerprint image frame to obtain the pixel intensity difference count value.

15. The system of claim 13, wherein said fingerprint roll start detector module finds compared pixels to be different if their intensity values differ by greater than a pixel intensity difference threshold.

16. A system for rolled fingerprint capture, comprising:
    a fingerprint roll start detector module that detects the start of a fingerprint roll in a fingerprint image capturing area, wherein the fingerprint roll start detector module generates a pixel intensity difference percentage value between a first fingerprint image frame and a second fingerprint image frame, wherein the fingerprint roll start detector module compares the intensity of a plurality of pixels in the second fingerprint image frame to the intensity of a corresponding plurality of pixels in the first fingerprint image frame to obtain a pixel intensity difference count value, and calculates the pixel intensity difference percentage value to be a ratio of the pixel intensity difference count value to the number of the plurality of pixels present in a fingerprint image frame, and wherein the fingerprint roll start detector module determines whether the generated pixel intensity difference percentage value is greater than a start roll sensitivity threshold percentage value.

17. The system of claim 16, wherein said fingerprint roll start detector module compares the intensity of each pixel of the second fingerprint image frame to the intensity of a corresponding pixel of the first fingerprint image frame to obtain a pixel intensity difference count value, and uses the pixel intensity difference count value to produce the pixel intensity difference percentage value, which is a percentage ratio of the pixel intensity difference count value to a total number of pixels present in a fingerprint image frame.

18. The system of claim 16, wherein said fingerprint roll start detector module finds compared pixels to be different if their intensity values differ by greater than a pixel intensity difference threshold.

19. A system for detecting the start of a fingerprint roll in a rolled fingerprint capture system, comprising:
    means for capturing a first fingerprint image frame;
    means for capturing a second fingerprint image frame;
    means for generating a pixel intensity difference count value between the second fingerprint image frame and the first fingerprint image frame, said means for generating including means for comparing the intensity of a plurality of pixels in the current fingerprint image frame to the intensity of a corresponding plurality of pixels in the previous fingerprint image frame, and means for summing pixels determined to have different intensities by said means for comparing to generate said pixel intensity difference count value; and means for determining whether the generated pixel intensity difference count value is greater than a start roll sensitivity threshold value.

20. The system of claim 19, wherein said means for comparing comprises:

means for comparing the intensity of each pixel of the second fingerprint image frame to the intensity of a corresponding pixel of the first fingerprint image frame to obtain the pixel intensity difference count value.

21. The system of claim 19, wherein said means for comparing comprises;

means for finding compared pixels to be different if their intensity values differ by greater than a pixel intensity difference threshold.

22. A system for detecting the start of a fingerprint roll in a rolled fingerprint capture system, comprising:

means for capturing a first fingerprint image frame;

means for capturing a second fingerprint image frame;

means for generating a pixel intensity difference percentage value between the second fingerprint image frame and a first fingerprint image frame, said means for generating including means for comparing the intensity of a plurality of pixels in the current fingerprint image frame to the intensity of a corresponding plurality of pixels in the previous fingerprint image frame to obtain a pixel intensity difference count value, and means for calculating the pixel intensity difference percentage value to be a ratio of the pixel intensity difference count value to the number of the plurality of pixels present in a fingerprint image frame; and means for determining whether the generated pixel intensity difference percentage value is greater than a start roll sensitivity threshold percentage value.

23. The system of claim 22, wherein said means for comparing comprises:

means for comparing the intensity of each pixel of the second fingerprint image frame to the intensity of a corresponding pixel of the first fingerprint image frame to obtain a pixel intensity difference count value.

24. The system of claim 22, wherein said means for comparing comprises:

means for finding compared pixels to be different if their intensity values differ by greater than a pixel intensity difference threshold.

25. The system of claim 22, wherein said means for comparing comprises:

means for counting the compared pixels found to be different to produce the pixel intensity difference count value.

* * * * *

UNITED STATES PATENT AND TRADEMARK OFFICE
CERTIFICATE OF CORRECTION

PATENT NO. : 6,483,932 B1
DATED : November 19, 2002
INVENTOR(S) : Chris J. Martinez and Walter Guy Scott It is certified that error appears in the above-identified patent and that said Letters Patent is hereby corrected as shown below:

Drawings,
Replace FIG. 8 with the attached corrected FIG. 8.

Signed and Sealed this

Twenty-first Day of February, 2006

JON W. DUDAS
*Director of the United States Patent and Trademark Office*